(12) United States Patent
Bullard et al.

(10) Patent No.: US 11,620,338 B1
(45) Date of Patent: Apr. 4, 2023

(54) DASHBOARD WITH RELATIONSHIP GRAPHING

(71) Applicant: Wells Fargo Bank, N.A., San Francisco, CA (US)

(72) Inventors: Angelica Bullard, Oakland, CA (US); Bobby F. Ignatius, San Franicsco, CA (US); Michael Traverso, Chicago, IL (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/595,219

(22) Filed: Oct. 7, 2019

(51) Int. Cl.
| | |
|---|---|
| *G06F 16/9035* | (2019.01) |
| *G06F 16/28* | (2019.01) |
| *G06F 3/04842* | (2022.01) |
| *G06F 16/901* | (2019.01) |

(52) U.S. Cl.
CPC ...... *G06F 16/9024* (2019.01); *G06F 3/04842* (2013.01); *G06F 16/287* (2019.01); *G06F 16/288* (2019.01); *G06F 16/9035* (2019.01); *G06F 2203/04803* (2013.01)

(58) Field of Classification Search
None
See application file for complete search history.

(56) References Cited

U.S. PATENT DOCUMENTS

| | | | |
|---|---|---|---|
| 6,925,468 B1 * | 8/2005 | Bobbitt | G06Q 40/00 707/703 |
| 7,593,892 B2 | 9/2009 | Balk et al. | |
| 8,266,148 B2 | 9/2012 | Guha et al. | |
| 8,504,456 B2 | 8/2013 | Griffin et al. | |
| 9,898,497 B2 | 2/2018 | Ruiz Velazquez et al. | |
| 10,026,049 B2 | 7/2018 | Asenjo et al. | |

(Continued)

OTHER PUBLICATIONS

"Business Analytics Financial Crime Risk Management Platform Reporting", https://www.fiserv.com/resources/business-analytics-financial-crime-risk-management-reporting-brochure-0916.pdf 2016. 2 pages.

(Continued)

*Primary Examiner* — Ryan Barrett
*Assistant Examiner* — Maria S Ayad
(74) *Attorney, Agent, or Firm* — Foley & Lardner LLP

(57) ABSTRACT

Data on entities and how they are associated with other entities may be aggregated from multiple sources and reconciled. The aggregated data may be presented in a dashboard with a graphical user interface (GUI) that represents entities (e.g., nodes) and associations (e.g., edges) as distinguishable graphical elements that are individually selectable. Different nodes/edges may have distinct graphical representations that correspond with certain characteristics of the nodes/edges. The dashboard may include multiple dynamically-updated panes that may be populated with different information depending on a user's interaction with the GUI and/or depending on information received from various sources. A first entity's connection to or involvement in certain activities may be more readily understood by interactively examining not just the first entity's relationship with a second entity, but also the second entity's relationship with a third entity which is not directly related to the first entity.

19 Claims, 13 Drawing Sheets

(56) References Cited

U.S. PATENT DOCUMENTS

| | | | |
|---|---|---|---|
| 10,102,515 B2 | 10/2018 | Vastenavondt et al. | |
| 10,680,918 B1* | 6/2020 | Mazzitelli | G06F 9/547 |
| 10,872,116 B1* | 12/2020 | Yim | G06F 16/61 |
| 2002/0055919 A1* | 5/2002 | Mikheev | G06F 16/951 |
| 2003/0018616 A1* | 1/2003 | Wilbanks | G06F 16/20 |
| 2007/0266039 A1* | 11/2007 | Boykin | G06F 8/34 |
| 2008/0201313 A1* | 8/2008 | Dettinger | G06F 16/248 |
| 2009/0248738 A1* | 10/2009 | Martinez | G06F 16/211 |
| 2010/0042944 A1* | 2/2010 | Robinson | H04L 67/535 709/224 |
| 2010/0088273 A1* | 4/2010 | Donaldson | G06Q 50/01 707/609 |
| 2010/0114899 A1* | 5/2010 | Guha | G06F 16/9535 707/741 |
| 2010/0318200 A1 | 12/2010 | Foslien et al. | |
| 2011/0131130 A1 | 6/2011 | Griffin et al. | |
| 2011/0238566 A1 | 9/2011 | Santos | |
| 2012/0030080 A1 | 2/2012 | Slater et al. | |
| 2012/0116839 A1 | 5/2012 | Akkiraju et al. | |
| 2013/0093771 A1* | 4/2013 | Simitsis | G06T 11/206 345/440 |
| 2013/0229416 A1* | 9/2013 | Krajec | G06F 11/302 345/440 |
| 2013/0254305 A1* | 9/2013 | Cheng | G06Q 10/101 709/206 |
| 2014/0019533 A1* | 1/2014 | Sherman | G06Q 50/01 709/204 |
| 2014/0278730 A1 | 9/2014 | Muhart et al. | |
| 2015/0073954 A1* | 3/2015 | Braff | G06Q 40/00 705/30 |
| 2015/0120775 A1* | 4/2015 | Shao | G06F 16/2456 707/769 |
| 2015/0294488 A1* | 10/2015 | Iwasaki | G06T 11/206 345/440 |
| 2016/0019668 A1 | 1/2016 | Kilinski | |
| 2016/0124612 A1* | 5/2016 | Covington | G06F 3/04842 345/173 |
| 2016/0140254 A1* | 5/2016 | Yan | G06Q 30/0629 715/771 |
| 2018/0039695 A1* | 2/2018 | Chalabi | G06N 5/022 |
| 2018/0082183 A1* | 3/2018 | Hertz | G06N 5/00 |
| 2018/0096003 A1* | 4/2018 | Vaishnav | G06F 16/217 |
| 2018/0293221 A1* | 10/2018 | Finkelstein | G06N 20/00 |
| 2019/0121801 A1* | 4/2019 | Jethwa | G06F 16/3334 |
| 2019/0303437 A1* | 10/2019 | Guarnieri | G06F 40/253 |
| 2019/0312869 A1* | 10/2019 | Han | G06F 21/64 |
| 2019/0318085 A1* | 10/2019 | Mathur | G06F 21/55 |
| 2020/0175174 A1* | 6/2020 | Bakalli | G06N 5/022 |
| 2020/0401583 A1* | 12/2020 | Church | G06F 3/0484 |
| 2022/0101833 A1* | 3/2022 | Ross | G10L 15/183 |

OTHER PUBLICATIONS

"Clari5 enterprise financial crime management and aml solution suite", https://financialit.net/products/security-compliance/clari5-enterprise-financial-crime-management-and-aml-solution-suite Dec. 4, 2010. 8 pages.

"Increase agility with a connected view of risk", https://www.refinitiv.com/en/products/connected-risk-management. Mar. 25, 2019 (obtained by wayback machine) 12 pages.

Chartis, "Tackling financial crime through integrated risk and compliance" https://www.ey.com/Publication/vwLUAssets/ey-tackling-financial-crime-through-integrated-risk-and-compliance/%24FILE/ey-tackling-financial-crime-through-integrated-risk-and-compliance.pdf 2015. 18 pages.

* cited by examiner

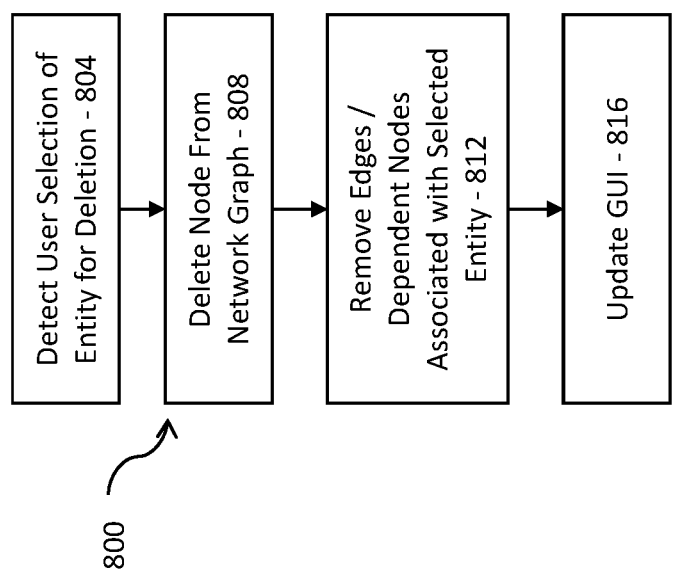

US 11,620,338 B1

DASHBOARD WITH RELATIONSHIP GRAPHING

BACKGROUND

The present disclosure relates to evaluation of entities and associations thereof through analysis and display of data on entities and associations in a dashboard with a relationship graph.

Suspicious activities and crimes are often not discoverable through the recorded activities of an individual, but through relationships of that individual with others. Some actors may (knowingly or unknowingly) be involved in suspicious activities indirectly. Certain activities may disguise financial crimes unless the activities are placed in the context of the activities of a group of entities with some discoverable association which may, in isolation, seem innocuous. Discovering these activities and associations may require coordination among different specialty groups aggregating different data from different sources. Often, the process is too ineffective to stop ongoing or future crimes that could have been avoided had the current or past suspicious activities been detected sooner. Even when the different types of data from different sources are available, the aggregated data is not easily reviewable in a manner that aids in exposing crimes in an efficient and effective manner.

SUMMARY

Various embodiments of the disclosure relate to a computer-implemented method. The method may comprise receiving data on a first entity, a second entity, and a third entity. The data may be received from multiple systems, devices, and/or servers. The method may comprise identifying, in the data, a first association between the first and second entities and/or a second association between the second and third entities. The method may comprise generating a relationship graph. The relationship graph may include first, second, and third nodes corresponding to the first, second, and third entities, respectively. The relationship graph may include first and second edges corresponding to the first and second associations, respectively. The first edge may graphically connect the first and second entities, and the second edge may graphically connect the second and third entities. The method may comprise presenting a graphical user interface (GUI) comprising the relationship graph. The GUI may be presented via a display of a computing device. The nodes and edges in the GUI may be selectable by a user. The method may comprise detecting selection of a node or edge of the relationship graph. The selection may be detected via an input device. The method may comprise presenting information on the selected node or edge. The information may be presented via the GUI.

Various embodiments of the disclosure relate to a computing device. The device may comprise one or more I/O interfaces for displaying graphical user interfaces and accepting user inputs. The device may comprise a network interface for communicating with remote systems and devices via a telecommunications network. The device may comprise a processor and a memory storing instructions which, when executed by the processor, cause the processor to perform specific operations. The computing device may be configured to receive data on a first entity, a second entity, and a third entity. The data may be received from multiple systems or devices that may be remote or co-located. The computing device may be configured to identify, in the data, a first association between the first and second entities and a second association between the second and third entities. The computing device may be configured to display a graphical user interface (GUI) comprising a relationship graph. The GUI may be displayed via the one or more I/O interfaces. The relationship graph may include selectable nodes corresponding to entities and selectable edges corresponding to associations between entities. The relationship graph may include first, second, and third nodes corresponding to the first, second, and third entities, respectively. The relationship graph may include first and second edges corresponding to the first and second associations, respectively. The first edge may graphically connect the first and second entities. The second edge may graphically connect the second and third entities. The computing device may be configured to detect selection of a node or edge of the relationship graph. The selection may be detected via the one or more I/O interfaces. The computing device may be configured to present information on the entity or association corresponding to the selected node or edge. The information may be presented via the GUI.

Various embodiments of the disclosure relate to a method implemented by a computing system. The method may comprise receiving data on a first entity, a second entity, a third entity, a first association between the first and second entities, and a second association between the second and third entities. The data may be received from multiple servers. The method may comprise presenting a graphical user interface (GUI) with first, second, and third selectable geometric shapes corresponding to the first, second, and third entities, respectively. The method may comprise presenting first and second selectable lines corresponding to the first and second associations, respectively. The first line may graphically connect the first and second geometric shapes. The second line may graphically connect the second and third geometric shapes. The method may comprise detecting selection of one of the geometric shapes or lines of the GUI. The selection may be detected via an input device of, for example, the computing system. The method may comprise presenting information on the entity or association corresponding to the selected geometric shape or line. The information may be presented in the GUI.

BRIEF DESCRIPTION OF THE DRAWINGS

FIG. 8 depict a flowchart of an example node removal process, according to potential embodiments.

DETAILED DESCRIPTION

Figure 1:
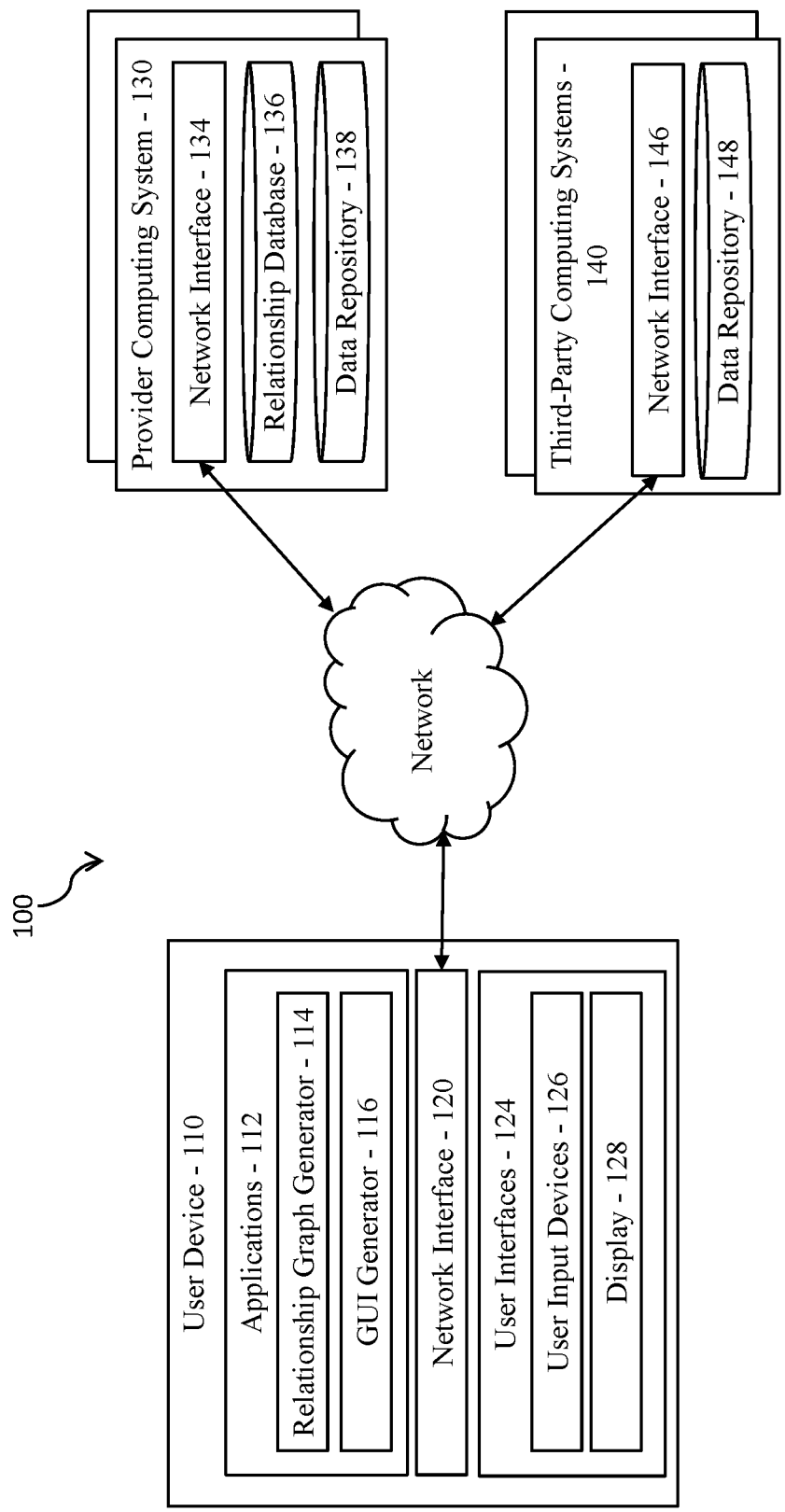
FIG. 1 depicts a block diagram of an example computer-implemented system, according to potential embodiments.

In various embodiments, data on entities and how they are related may be aggregated from multiple sources. The aggregated data may be presented in a dashboard with a graphical user interface that represents entities and relationships (used interchangeably with associations) as distinguishable graphical elements that are individually selectable. Entities may be represented as nodes (e.g., geometric shapes, with different entity types potentially represented by different shapes), and relationships may be represented as edges (e.g., lines, with different relationship types potentially represented by lines of different styles). Relationships may be personal, commercial, or legal associations. Nodes and edges may be positioned and/or sized to, for example, reduce or minimize the number of edges that intersect, to fill a certain designated or available space, etc. The dashboard may include multiple panes or segments, with different panes or segments populated with different information depending on a user's interaction with the graphical user interface and/or depending on information received from various sources. Panes may provide updates in real time or near real time. Different panes could be dedicated to different types of information (e.g., information on specific nodes or edges, general information, raw data, metadata) or to information from different sources (e.g., internal data, external data, government data, public data, subscription service data). Panes may be dynamically updated depending on user selections and/or on information newly-received from one or more sources. Nodes and edges may be varied visually depending on what is presented in panes, such that, for example, a node or edge is emphasized (e.g., by being enlarged or made relatively darker) if or while additional details are being presented on that node or edge in one or more panes. For example, a node or edge may be emphasized similarly to a corresponding pane with information on the node or edge, such as, for example, both the node/edge and the pane with information on the node/edge sharing a similar color or color scheme, line style, etc. A first entity's connection to or involvement in certain activities may be more readily understood by interactively examining not just the first entity's relationship with a second entity, but also the second entity's relationship with a third entity which is not directly related to the first entity. For example, a potential financial crime directly involving two entities may additionally involve a third entity who is not directly associated with the two entities (based on available data), but which may be a third-party intermediary as can be determined by examining identifiable relationships.

Various embodiments described herein relate to systems and methods for generating and displaying an interactive graphical user interface (GUI) in which a user can dynamically analyze data associated with entities of interest (EOIs) to a provider. A provider may be any kind of organization, such as a financial institution, government agency, insurance provider, commercial enterprise, etc., with an incentive to reduce risks or otherwise understand relationships between various entities. An entity herein can be a person or organization associated with the provider (e.g., a customer) or not associated with the provider. A user can be, for example, an analyst or risk manager of the provider interested in understanding the risk posed to the provider by a particular entity and/or as a result of the entity's associations with one or more other entities. The user may want to understand how certain entities are related to better understand potential risks that are not otherwise apparent.

In potential embodiments, relationships between entities may be represented in a relationship graph (used interchangeably with network graph or relationship network graph). A relationship graph presents a web or network in which related entities are connected and unrelated entities are not connected. Relationship graphs can be presented visually by, for example, displaying a network of nodes (which may be represented by dots, circles, or other shapes) connected by edges (which may be represented by, e.g., straight or curved lines or other connectors), where the edges represent a past or present association, which may be explicit (e.g., co-ownership), implicit (e.g., co-workers), or suspected (e.g., based on identification of certain activities occurring seemingly coincidentally around the same time), between two nodes. A relationship between entities can be, but is not limited to, a family relationship (such as spouse, parent/child, sibling, cousin, in-law, etc.), a commercial relationship (such as owner/co-owners of a business, business partners, co-workers, customer, distributor, contractor, etc.), or other relationship (such as acquaintance, neighbor, classmate, etc.). A relationship may be determined by, for example, identifying a shared financial interest, joint accounts or assets, or history of transactions, by making associations from news reports, publications, etc. An association may be deemed direct or indirect. These classifications and all other classification of relationships can exist, for example, between two individuals, between an individual and an organization, between two organizations, between an individual and a group (e.g., a group of individuals or organizations), or between two groups (of individuals and/or organizations), and can be represented in the relationship graph.

A user may be interested in analyzing risk data associated with an entity in the relationship graph. A user may be interested in risk data for both a principal EOI (such a customer, individual, organization, etc.) and entities variously related to the principal EOI. Risk data may include, but is not limited to, personal information, account information, risk ratings and metrics, suspicious activity reports, and relationship information pertaining to another entity in the relationship graph.

Risk data can be collected and/or aggregated by a computing system to identify relationships between entities for presentation in, for example, a dashboard with a relationship graph. Risk data can be retrieved from internal and/or external data sources. Retrieval of risk data may include or be followed by processing to generate new risk data from other forms of data (e.g., metadata or analyses, summaries, or graphical representations of processed or unprocessed data). A user device can display the collected, aggregated, and/or processed risk data and the generated relationship graph in a GUI for more effective analysis of potential risk to the provider by variously related entities. Various embodiments allow an analyst to interact with the network graph displayed on the GUI to investigate, add, and/or delete entities in the network graph. Addition or deletion of entities or associations may be based on, for example, application of filters and/or user selections to add or delete a particular entity or association.

Embodiments of the disclosure provide a unified analysis platform for identifying an EOI's risk factors with respect to a financial institution or other service provider in a manner not previously available. An analyst can easily view relevant risk data for the EOI, efficiently identify related entities, and quickly find risk data corresponding to both the EOI and distantly-related entities. A first entity's connection to or involvement in certain activities may be more readily understood by interactively examining not just the first entity's relationship with a second entity, but also the second entity's relationship with a third entity which is not directly related to the first entity. For example, a potential financial crime known to directly involve two entities may additionally involve a third entity who is not directly associated with the two entities (based on available data), but which may be a third-party intermediary that can be identified by examining various graphically-represented relationships.

Analysts can add entities or associations to a relationship graph if analysis deems such an addition to be valuable in understanding an entity's risk. For example, a relationship graph that does not show certain familial or business relationships may, upon a selection to add such relationships, expose certain criminal or suspicious activities not otherwise discovered. Additionally, analysts can delete entities and associations from a relationship graph as deemed appropriate to remove unnecessary entities or associations that may be distracting or irrelevant (i.e., that may be "noise"). Multiple relationship graphs may be generated for more comprehensive analyses, either in succession or concurrently.

Referring now to FIG. 1, a block diagram of an example networked system 100 enabling analysis of risk data is shown. System 100 can include one or more user devices 110, one or more provider computing systems 130, and one or more third-party computing systems 140. Various embodiments of system 100 allow systems or components to be connected in various ways through various types of networks, such as, but not limited to, local access network, private network, the Internet, the cloud, internet provider service, or any other network configuration. In various embodiments, a system, a server, or a device may include or be replaced by multiple servers, systems, and/or computing devices, and as such, the terms server, computing system, and device may in places be used interchangeably.

User device 110 may, in various embodiments, retrieve, process, and/or present data for risk analysis by displaying a dashboard to a user. Processing data may include building a relationship graph from retrieved risk data, analyzing risk data, identifying entities and/or relationships, etc. A user device may be any computing device able to display a GUI and receive user input such as, but not limited to, a computer, a laptop, a smartphone, interconnected servers, or other similar device. User device 110 may contain memory storage for received risk data and relationship data. User device 110 can include applications 112, network interface 120, and user interface 124. Network interface 120 allows the user device 110 to be communicably connected to computing systems 130 and 140 and other devices via the network. User device 110 may also include an operating management system that generally controls the flow and process of components of user device 110 and in some implementations, aids in facilitating the methods described herein.

Applications 112 may be or may comprise software or hardware configurations for providing various functionalities and/or performing various tasks. Applications 112 may process, store, and/or present data associated with an entity or a relationship graph. Applications 112 may generate a relationship graph to be presented for analysis, or may present a graph received from another system or device. Applications 112 may also accept user input and generate corresponding outputs. In some implementations, applications 112 output a GUI for organizing and displaying information to a user. Applications 112 can exist within or be managed by a larger application or interface, such as, but not limited to, an HTML or internet browser, locally-operated program or application, or a virtually-operated program. Operations of the applications can, in some implementations, be facilitated within or with the aid of an operating management system.

Applications 112 may include a relationship graph generator 114. In potential embodiments, relationship graph generator may collect data, identify relationships, and build relationship graphs. Relationship graph generator 114 may also manage graph-manipulations by the user or computing system. Graph manipulation may include adding, removing, selecting, and hiding elements from the relationship graph. Functions and features of the relationship graph generator 114 will be described in more detail in relation to FIG. 2.

Applications 112 can also include GUI generator 116. GUI generator 116 may build and update a graphical user interface for user display 128. GUI generator 116 may receive data from other components of applications 112 to be displayed to a user. GUI generator 116 may use and/or store settings and parameters of display 128 to generate a GUI. In some embodiments, GUI generator 116 may generate a dashboard in which the data and relationship graph can be presented. Such a dashboard may include panels (used interchangeably with panes) which organize the display of data. The relationship graph may or may not be presented within a panel. Data panels may be dedicated to a particular type of data, entity, or association. GUI generator 116 may automatically update data displayed in the GUI as new data becomes available or as user selections are detected.

The retrieval of data by applications 112 can be performed in various ways. In potential embodiments, data retrieval includes sending requests to one or more databases, devices, servers, and/or systems for data associated with an entity. The request could comprise an entity's name (and/or one or more other identifiers), and/or an identification of the type, amount, or threshold-criteria of data to retrieve. Alternatively or additionally, the request could comprise specific instructions, such as a SQL query or application-specific code, to retrieve risk data. Provider computing system 130 and third-party computing systems 140 could include hardware and software capabilities to receive such requests or instructions, compiling or reducing data stored in said repositories, and package such data for transmission.

User interface 124 can interface with user input devices 126 and displays 128. User input devices 126 could include, but are not limited to, keyboards, computer mouse, trackpads, touch screens, controllers, or any other user input device. Displays 128 can be any electronic monitor or screen capable of outputting a GUI to a user. User input devices 128 enable a user to navigate various applications and programs on a user device 110. Likewise, user input devices 128 may indicate to applications 112 various manipulations of a relationship graph or risk data, such as selection of an entity for further selection, additions, or deletions of a graph element. Display 128 provides a user with retrieved or organized risk data as well as a visual representation of a generated relationship graph. Display 128 may stipulate to GUI generator 116 specific viewing settings or parameters for output of the GUI.

User device 110 may also include hardware and software for performing machine learning or data mining techniques for generating additional data for relationship graph generator 114 and/or GUI generator 116. Machine learning and data mining techniques could include, for example, artificial intelligence algorithms or natural language processing. Alternatively or additionally, such analytics may be performed by components of the provider computing system 130 and/or the third-party computing system 140.

Provider computing system 130 may include one or more servers or other devices managed by a financial institution or other provider. Devices of provider computing system 130 may include memory storage and/or a database, such as data repository 138, for storing data about a provider's customers. Provider computing system 130 may also include a relationship database 136 for data specific to generating relationship graphs. A provider can manage various kinds of customers, including but not limited to, individuals, joint ventures, partnerships, companies, or others. In various implementations of this disclosure, the provider may be a financial institution. Customer data stored on in data repository 138 could include, but is not limited to, customer information, account information, transaction information, company information, credit scores, suspicious activity reports, news reports, and/or other information associated with or relevant to the provider. Provider computing system 130 may also store analyzed or processed data computed by the user device 110. Provider computing system 130 also includes network interface 134 to communicably connect to other devices in system 100.

In various implementations, relationship database 136 may store generated relationship data. Generated relationship data could include identification of a relationship between two entities, partial or complete relationship graphs, user graph preferences or configurations, indications of node additions or removals, recent risk data retrievals, or any other related data associated with generating and viewing relationship graphs. Relationship database 136 may be used to reduce computation in generating relationship graphs as well as to create continuity between different instances of relationship graphs. For example, a user may have previously generated a relationship graph for analysis, wherein the user specified criteria for inclusion of entities in the graph, and/or made manual additions or removals of entities from the relationship graph. This information could be stored in relationship database 136 such that when the user later requests the same relationship graph to be generated, the relationship graph generator 136 can retrieve the previously built graph as it was previously constructed.

Third-party computing systems 140 may include one or more servers or other devices managed by one or more third-party entities. Third-party computing systems 140 may include network interface 146 to communicably connect to other computing devices in networked system 100. Devices in the third-party computing systems 140 may comprise one or more memory storages or databases, such as data repository 148, for storing data managed, owned, or otherwise made available by the third-party entity. Third-party computing systems 140 may also manage and/or provide one or more applications 112 or components thereof. The third-party entity may be any entity outside the provider, such as, but not limited to, a news outlet, another service provider, a government database, a public database, a social media site, or any other third-party entity that may manage data relevant to an EOI to the provider. Information stored in data repository 148 could include, but is not limited to, personal information, financial information, criminal records, public records, social media posts, news articles, or any other type of information. For a third-party computing system 140 not made available to the public, the third-party computing system 140 may be accessible by user device 110 or provider computing system 130 by a pre-authentication protocol wherein the user device 110 or provider computing system 130 is approved to access or request third-party computing system 140 for relevant data.

Each system or device in system 100 may include one or more processors, memories, network interfaces, and user interfaces. The various components of devices in system 100 may be implemented via hardware (e.g., circuitry), software (e.g., executable code), or any combination thereof. The memory may store programming logic that, when executed by the processor, controls the operation of the corresponding computing system or device. The memory may also store data in databases. In some embodiments, databases can be arranged in a tabular format or any other data format. The network interfaces allow the computing systems and devices to communicate wirelessly or otherwise. The devices in system 100 can be connected via a local network, internet connection, direct connection, or some combination therein.

Devices and components in FIG. 1 can be added, deleted, integrated, separated, and/or rearranged in various embodiments of the disclosure. For example, in some embodiments, provider computing system 130 may include systems for performing some or all of the functions performed by applications 112 (in addition to or in place of their performance on user device 110). Such embodiments may be preferred if certain computations in the processes disclosed are too complex, overbearing, or time-consuming for a user device 110. In such embodiments, provider computing system 130 may retrieve and store aggregated risk data, run processing to identify associations between entities, generate the relationship graph, and/or generate a GUI for display by user device 110. Such configurations could be performed by a virtual private network (VPN), hosted computer, internet webpage or server, or other configuration. Likewise, certain embodiments may have an application managed by a third-party server and provided to the user device in a similar configuration.

Figure 2:
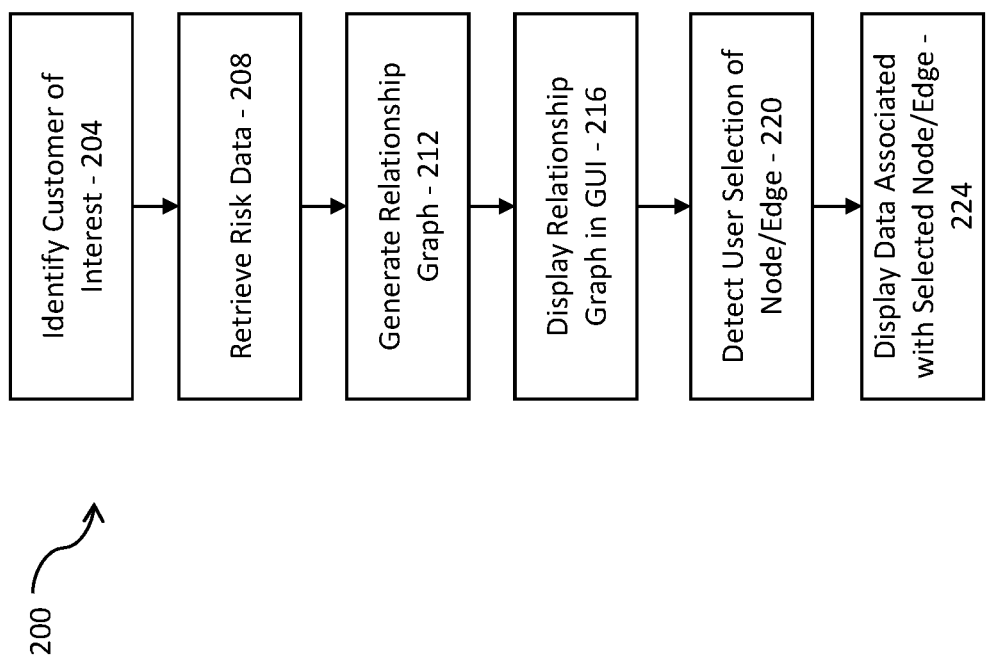
FIG. 2 depicts an example flowchart for generating and interacting with a graphical user interface, according to potential embodiments.

Referring now to FIG. 2, a process 200 for generating and displaying an interactive relationship graph for risk analysis of a customer for a provider such as a financial institution is shown, according to potential embodiments. In various implementations, process 200 may be performed by the user device 110 and/or by provider computing system 130 in system 100. Process 200 retrieves data associated with an EOI that may be a customer (also referred to as a customer of interest or "COI") and entities related to the COI. The COI can be, for example, an individual or a business. Process 200 also generates a relationship graph and displays the relationship graph on a GUI. A user can interact with the displayed relationship graph to display additional risk data associated with one or more entities in the relationship graph.

Process 200 can comprise identification of the COI at step 204. A user or analyst can select or request, for example, which customer or entity associated with the financial institution should be analyzed. Any mechanism for indicating a selection of a customer to analyze fall within the scope of this step. In potential embodiments, the user can search for the customer in a database associated with the financial institution to select the COI. In potential embodiments, a customer can be selected by a computer program based on, for example, detection of a certain activity, transaction, or condition.

Process 200 retrieves and aggregates risk data associated with the COI and its related entities at step 208. Step 208 can comprise requesting risk data from one or more systems or devices. Step 208 can also comprise reformatting data into one or more data structures or formats. Step 208 can also comprise performing data analyses on structured and unstructured data.

Risk data can come from a variety of different sources. For example, the provider computing system 130 may comprise one or more databases, each with a different kind of data associated with the service provider, such as transaction data, customer data, liability data, account data, loan data, wire transfer data, or any other type of data related to a financial institution. Risk data can also be retrieved from third-party computing systems 140 of other entities, such as other service providers, governmental bodies, news outlets, social media, or any other relevant source. Risk data retrieved from third-party computing systems 140 could include, but are not limited to, financial health profiles, criminal records, news articles, social media posts, residential information, employment information, or any other useful data. In some implementations, a user device may store and retrieve certain previously retrieved risk data in local storage for faster retrieval.

Risk data retrieved from different sources can be transmitted in different formats and thus require reformatting such that data from different sources can be aggregated, analyzed, and stored together. Such formatting could include data reduction, generation of new data structures, reconciliation of two formats, or any other data manipulation. Data formats can be optimized, for example, for storage, analysis, transmission, and/or processing. In potential embodiments, data retrieved from two different sources may exist in two different proprietary formats or different tabular formats, and step 208 may include identifying and merging similar or identical data or columns and remove unnecessary or redundant data or columns.

Step 208 can also include performing data analysis on structured or unstructured data. Data analysis can generate new risk data (e.g., metadata) from other types of data. These can include calculated risk metrics, aggregated statistics, trend calculations, or alias identification. Additionally, the system could use data mining techniques on unstructured data to generate risk data not received or available from another source. For example, the provider computing system 130 may retrieve news articles from a particular region or time period and apply data mining techniques to identify related entities associated with a COI. In various embodiments, social media data could be processed using data mining techniques to further identify disclosed or behavioral risks to the service provider or identify related entities in regards to social relationships. Additionally, a device (e.g., user device 110 and/or provider computing system 130) may perform natural language processing on audio or video clips of, for example, an interview or report, to generate structured data for risk analysis.

In some embodiments, step 208 can involve user device 110 (or provider computing system 130) retrieving relationship graph data from a relationship database 136. Relationship graph data could include previously determined relationships or relationship graphs. Such relationship data could be used to identify data which does not need to be retrieved due to its availability in the relationship database 136. Such an evaluation could help to reduce the computational complexity of aggregating data at step 208.

As discussed in subsequent steps, process 200 can involve retrieval of data at several steps or in between steps of its execution, and data retrieval need not be solely limited to step 208.

Still referring to FIG. 2, process 200 includes generating a relationship graph at step 212. Generating the relationship graph may comprise identifying related entities, selecting and assigning entities to nodes for inclusion in the relationship graph, determining the relationship between the entities, and assigning relationships to edges. Relationship graphs may be generated about a central node representing the COI or other primary EOI. Other relationships may be identified about and in direct or indirect reference to the central node. A relationship graph can be represented as a data structure, matrix, or any other mechanism used to represent similar graphical data. Step 212 may include generating a part or all of the relationship graph from data retrieved from a relationship database 136 at step 208.

The relationships between entities can be identified in various ways. For example, two or more entities could share the same address, phone number, email address, etc. Entities could be found to engage in one or more financial exchanges or transactions. Financial transactions may be deemed to indicate an association due to, for example, the amounts, frequency or regularity, unexpectedness (e.g., between two otherwise seemingly unrelated entities), etc., of the transactions. Two or more entities could share a joint bank account or co-own other assets. Two or more entities could be related by a joint business venture, such as a partnership, limited partnership, corporation, limited liability company, non-profit organization, or other business or commercial enterprise. Two or more entities could be associated by known or suspected activity, such as suspicious activity reports, money laundering suits, criminal proceedings, etc. Two or more individuals could be identified as married or otherwise associated through others, such as family members, co-workers, or recreational friends. Likewise, an individual could be related to a business entity as, for example, an employee, owner, financial beneficiary (e.g., investor or source of loans), etc. A business entity could be related to another business entity through cooperative agreements, transactions, or ownership. Identification of such relationships can be performed by analysis of such data as personal information, account information, transaction histories, wire or other funds transfers, public records, news reports, publications, or any other data collected as discussed herein. In various embodiments, other relationship types and mechanisms for identifying associations may, alternatively or additionally, be implemented.

Nodes in relationship graphs can have varying degrees or levels of association with respect to an EOI. A node's level or degree of association can be characterized by its degree of separation (DOS) value, defined as the minimum number of edges (relationships) that connect a distant node (entity) to a central node (EOI). The central node may be defined as having a DOS value of zero, nodes directly connected to the central node have a DOS value of one, and other nodes have DOS values greater than one. For example, a node directly connected to a node that has a DOS value of one, but is not directly connected to the central node, has a DOS value of two. The greater the DOS value, the more distantly-related an entity is with respect to the EOI.

Identification of potentially related entities may produce a list of entities from which only a subset of entities may be selected for inclusion in the relationship graph. In some embodiments, a user specifies criteria for which entities should be included in the generated relationship graph. For example, a user may select only the top three related entities based on a risk metric calculation. In another example, a user may select only to include entities that are related in some fashion (e.g., as family or business partners). In another example, a user may select only to include entities that share financial interests greater than a threshold amount (e.g., $1,000 or $10,000). In various embodiments, a user may select a number of entities to include in the generated network graph. For example, a user may specify that only three related entities be included per entity. Similarly, a user may select to only include a certain number of levels, or degrees, of association with respect to the EOI. A relationship graph can be generated to include all entities with a specified DOS value smaller than or equal to a maximum DOS value as selected by the user, and exclude entities from the relationship graph with a DOS value greater than the specified DOS value. The specified DOS value can be dynamically changed to include more or less data or more and/or fewer entities. The types and examples of criteria for selection in a relationship graph described herein are not meant to be limiting. Any combination of criteria may be used as well for selecting entities for inclusion in a relationship graph.

In some embodiments, relationship graph generation may be performed as an iterative process. For example, a first COI may be identified and a first set of data retrieved pertaining to the first COI. Using this first set of data, related entities may be identified (i.e., first-level related entities with respect to the first COI). A user may then select one or more of the first-level related entities in the relationship graph as additional COIs. For each selected first-level related entity (i.e., for each additional COI selected), another iteration of data retrieval may be performed to acquire additional sets of data associated with the selected first-level entities. From these additional sets of data, entities related to the selected COIs can be identified (as second-level related entities with respect to the first COI, and first-level related entities with respect to the selected COI). This process can be repeated for as many iterations or levels of relationship as selected by the user.

In certain embodiments, relationship graph generation may rely on previously generated relationship graphs for either the COI or related entities. For example, a financial institution computing system may store all identified relationships or generated relationship graphs such that subsequent requests for relationship graph generation can reuse processed relationship data. Such embodiments could be used in combination with additional data retrieval to expand the relationship graph to entities not previously analyzed.

Referring still to FIG. 2, a GUI is generated and displayed at step 216. The GUI can be any visually-perceptible interface in which an interactive relationship graph can be presented. In addition, a GUI may display relevant risk data in association with the relationship graph. A user can interact with the GUI to sort, request, or analyze risk data associated with entities in the relationship graph. The GUI can accept user input from the user in a variety of ways. A user can select a node or edge in the relationship graph, and/or use a drop-down menu or list, or use a text search bar, or via any other user input mechanism. The GUI can also include pop-up messages and windows for additional selection choices or views.

Figure 3A:
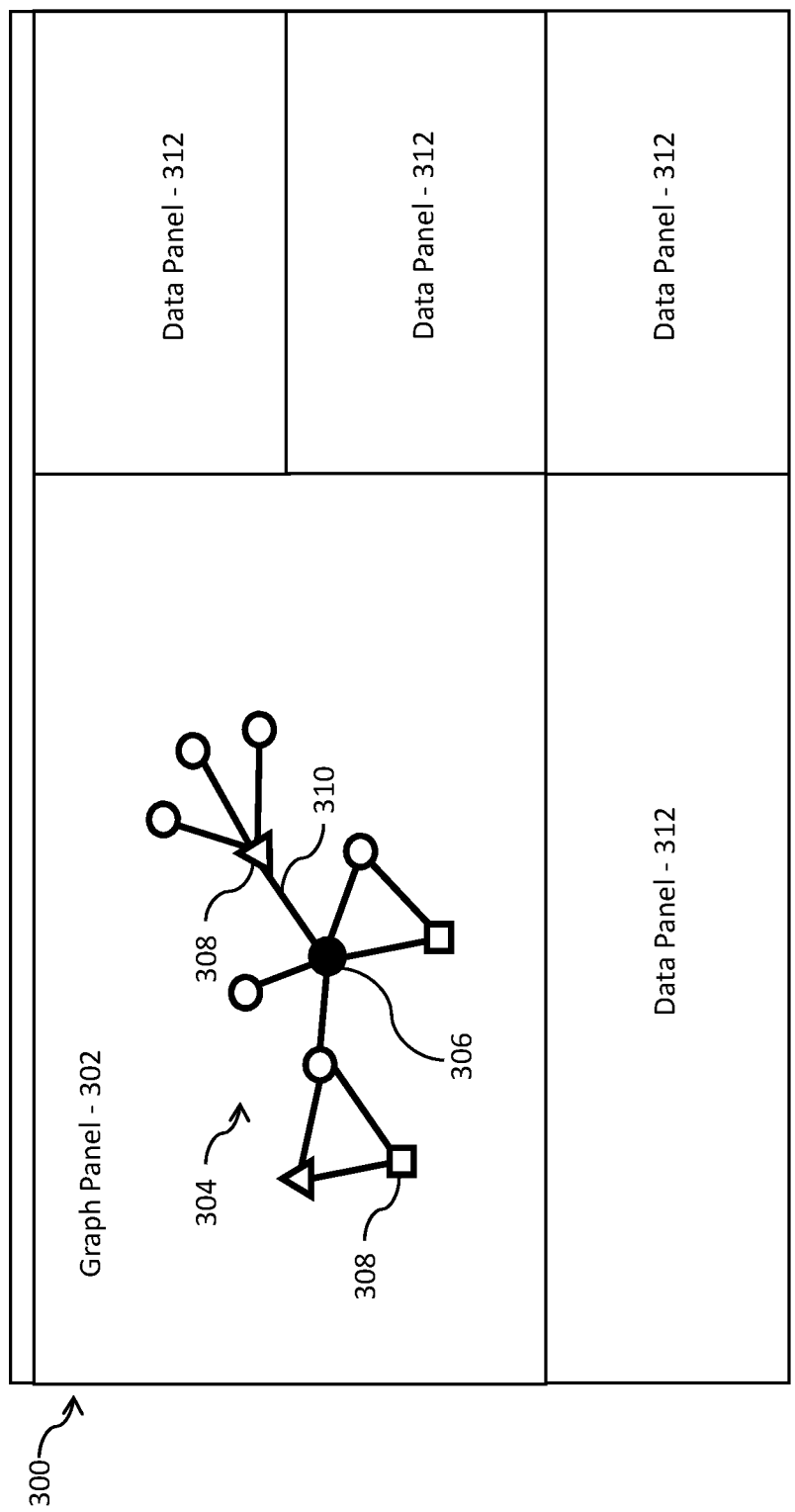
FIGS. 3A and 3B depict example relationship graphs, according to potential embodiments.

Referring to FIG. 3A, an example GUI 300 is shown according to various embodiments. In potential embodiments, GUI 300 is presented as or part of a dashboard including a graph panel 302 and various data panels 312. In some embodiments, GUI 300 can also include a mechanism for navigating within a larger application (e.g., navigation to other screens or pages). Data panels 312 can be a mechanism to organize or separate displayed data based on a characteristic of the data, such as, but not limited to, the type of data, origin of the data, or association of the data with a specific entity (such as a selected entity). The layout and style of GUI 300 in FIG. 3 are for illustrative purposes only; the positioning, quantity, and style of the various panels can be of any form or type, and the specific layout shown in FIG. 3 is not to be regarded as limiting. Likewise, data display is not be limited to the panel format of graph panel 302 and data panels 312. Data can be presented to the user in other forms and configurations, such as pop-up windows, text, images, or other graphics that may be superimposed with a relationship graph or a component thereof, or another portion of the GUI. Data panels left empty in subsequent figures do not bar the possibility that information is displayed in those panels.

Figure 3B:
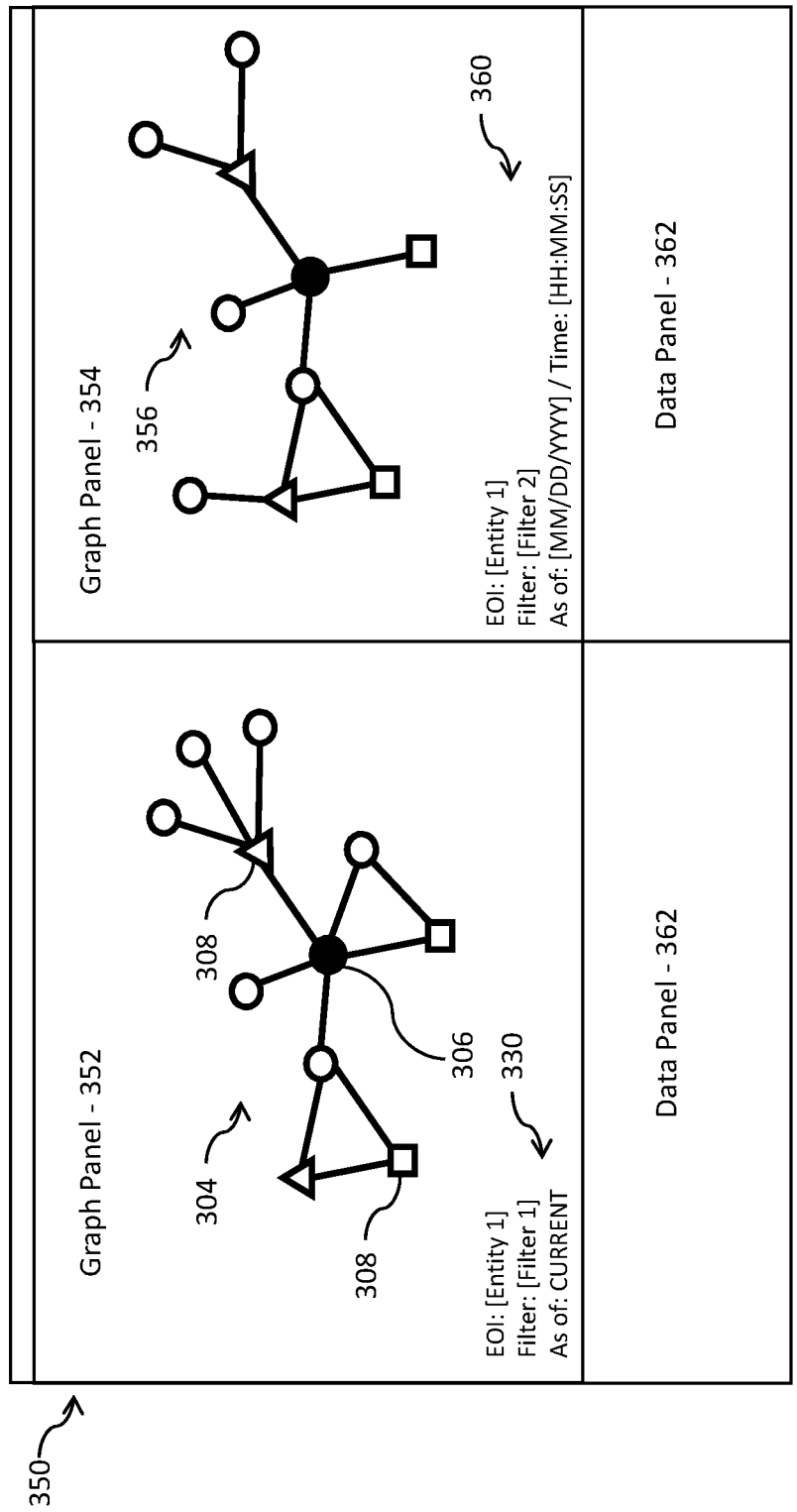

In potential embodiments, a GUI may present multiple relationship graphs in various configurations. Referring to FIG. 3B, an example GUI 350 includes a dashboard with a first graph panel 352 and a second graph panel 354 (along with various data panels 362). First graph panel 352 includes, as an example, the relationship graph 304 depicted in FIG. 3A. Second graph panel 354 includes another example relationship graph 356. In example GUIs, a "side-by-side" presentation may allow two relationship graphs to be compared to reveal, for example, how relationships are evolving, such as how starkly or subtly relationships have changed over time, to highlight differences between relationships of different EOIs, or to focus on different types of associations. The two relationship graphs may be, in some implementations, two graphs with a common characteristic or otherwise related in some fashion. For example, the two relationship graphs may have the same EOI but the first relationship graph may be a relationship graph as generated using the most up-to-date information ("current"), and the second relationship graph may be a past graph representing a prior state of affairs (e.g., as generated using the latest data available at a specific point in time); this may help expose, for example, that since a certain amount of time ago (e.g., day, week, month, or year), the EOI has become more or less associated with certain entities in certain ways, or has become more or less involved in certain types of associations. Additionally or alternatively, two relationship graphs may differ in their EOIs, and/or may have one or more entities or associations (or types of entities or associations) in common. Similarly, two relationship graphs may have different filters applied. For example, one relationship graph may show associations in different geographic region (e.g., domestic vs. international) or associations involving certain transaction amounts (e.g., $100 to $9,999 in one relationship graph vs. $10,000 and above in another relationship graph). In certain implementations, one or both relationship graphs may include legends with characteristics such as EOI, filters applied, and date/time for the corresponding relationship graphs (e.g., first legend 330 corresponding to first relationship graph 304 and second legend 360 corresponding to second relationship graph 356).

Returning to FIG. 3A, graph panel 302 may include the relationship graph generated at step 212. Graph panel 302 may include relationship graph 304 in which nodes and edges are represented as distinguishable graphical elements. Relationship graph 304 comprises a central node 306 which represents the identified COI or other principal EOI. Relationship graph 304 comprises related nodes 308 of varying degrees of association with respect to the central node 306. Relationship graph 304 comprises edges 310 used to relate or associate various nodes to or with each other. As discussed herein, nodes represent entities and edges represent the identification of a relationship (used interchangeably with association) between entities in relation directly or indirectly to an EOI. Graphical elements in graph panel 302 can be of different styles and/or change styles responsive to user input and responsive to data from various sources and/or analyses thereof.

Data panels 312 may display various information relevant to risk to the user. Data displayed in data panels 312 could include numerical or text-based data, accumulated data such as data statistics, or graphical data such as, but not limited to, trend graphs, bar graphs, pie charts, or data tables. In some embodiments, data panels 312 are organized such that each panel displays a different type of data (e.g., transaction data, personal data, relationship data, criminal information, etc.). In various embodiments, data panels 312 are organized according to which entity the data is associated with (e.g., the EOI, a second entity, a third entity, relationship data between two specific entities, etc.). In certain embodiments, data panels 312 organize data based on the source or origin of the data. Displayed information could include any information collected and useful to a user as discussed herein, such as but not limited to, personal information (e.g., home address or marital status), account information (financial account or other types of accounts such as social media accounts and information related thereto such as posts and audiovisual media), credit score or other credit-related data (from, e.g., a credit agency), risk rating, asset valuations, employment status and employer information, criminal records (violations, charges, etc.), relation to the EOI (e.g., transactions with the EOI), or any other useful risk data. In certain embodiments, data panels can contain information about all entities in the relationship graph, and can include information about entities not presently included in the relationship graph. In some embodiments, data in GUI 300 does not need to conform to the depicted panel style configuration, and data panels 312 can be rearranged, resized, reduced, or copied as suited to an application or particular circumstances.

Figure 4A:
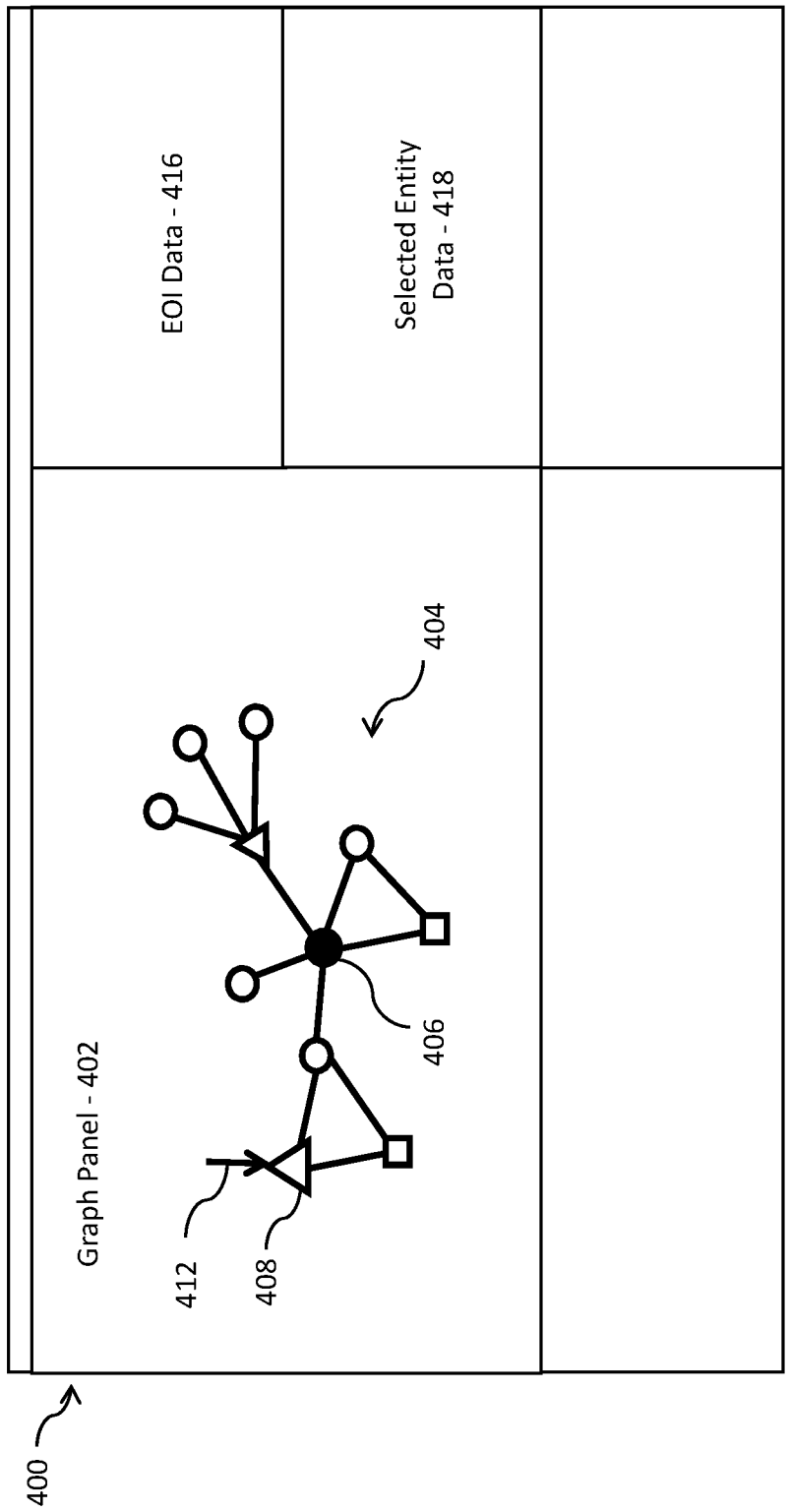
FIGS. 4A and 4B depict example graphical user interfaces with data panels, according to potential embodiments.
Figure 4B:
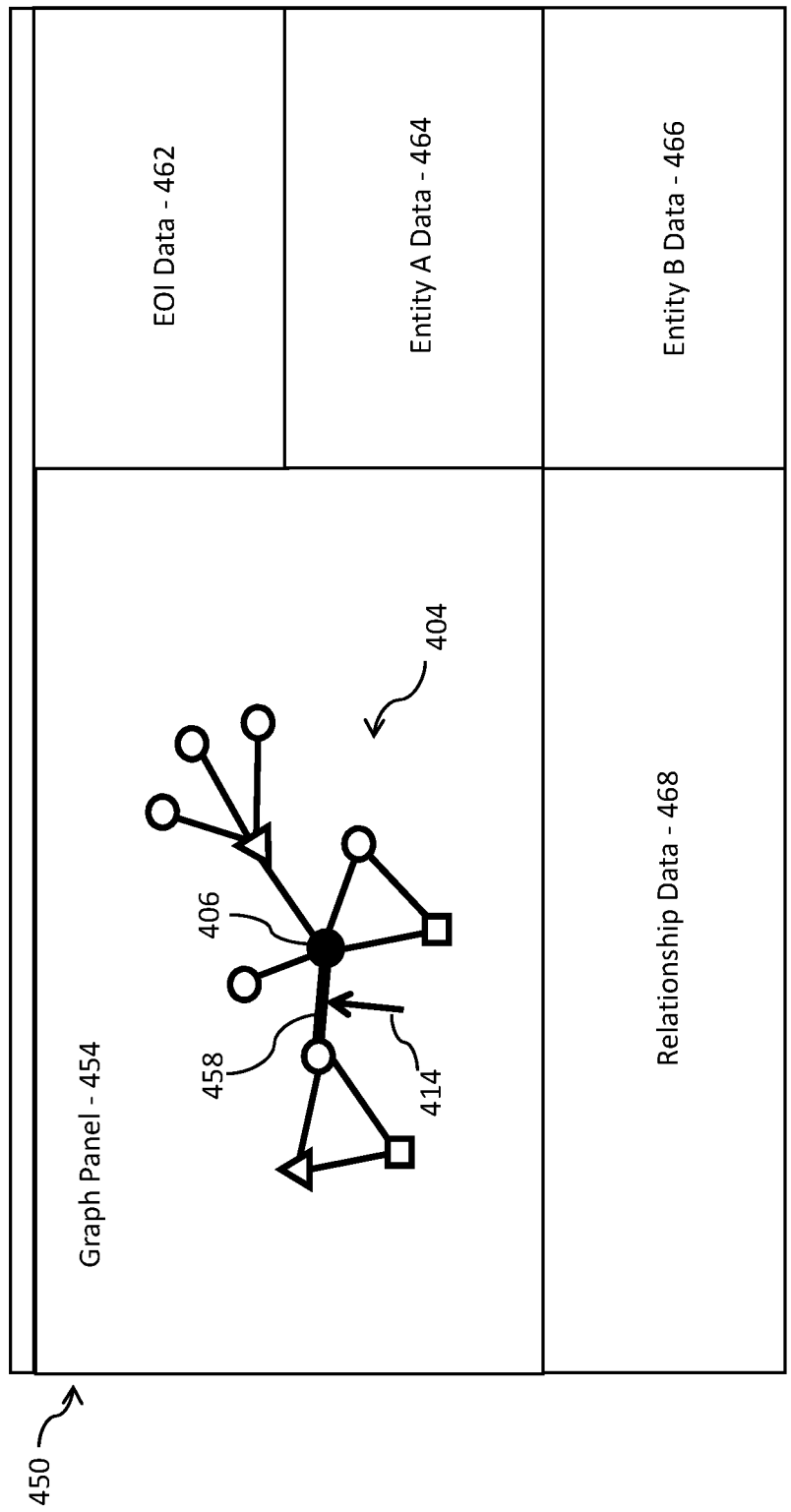

Process 200 further comprises detecting the user selection of a node or edge at step 220. In some embodiments, selection of a node or edge is detected via selection of an item in a list of elements in or related to the relationship graph 304. In certain embodiments, the user can directly select an element on the relationship graph 304 in graph panel 302 (by, e.g., touching the node or edge on a touchscreen). In some embodiments, the GUI may, upon selection of a node or edge, illustrate in the relationship graph that the node or edge has been selected. Example illustrations include enlarging the selected node or edge relative to other nodes or edges, emboldening or shadowing the outline of the node or edge, highlighting or changing the color of the node or edge, inserting an arrow or other indicator distinguishing the selected node or edge, inserting a graphic animation, adding a pop-up window or menu, and/or another illustration. In various embodiments, unselected elements of the relationship graph may be dimmed, darkened, shaded, faded, or otherwise deemphasized so as to emphasize the selected element or elements for the viewer relative to unselected nodes and edges. Referring to FIG. 4A, for example, selection of a node 408 (e.g., enlarged and/or marked by arrow 412 or other visual indicator) in the network graph in graph panel 402 of GUI 400 is shown. FIG. 4B depicts selection of edge 458 (e.g., thickened and/or marked by arrow 414 or other visual indicator) in network graph 404 for further analysis. Various methods of illustrating the selection of a node or edge are shown in FIGS. 4A and 4B.

Upon selection of a node or edge, data associated with the selected node or edge is displayed in the GUI at step 224. In some embodiments, data is displayed in one or more dedicated panels such as data panel 416, 418, 462, 464, 466, and 468. In some embodiments, data presented responsive to the selection of a node or edge may result in the removal of data previously presented in a data panel. In such potential embodiments, as seen in FIG. 4A with the selection of node 408, risk data associated with the entity represented by node 408 may be condensed and displayed in a data panel 418 wherein the data was not previously presented to the user prior to the selection. In FIG. 4B, according to potential embodiments, risk data associated with a first entity and second entity connected by the selected edge 458 can be displayed in data panels 464 and 466, respectively. In some instances, one of the two entities connected by a selected edge is the EOI. GUI 450 may also display data specific to the relationship between two entities in a different panel (e.g., data panel 468). Relationship data panel 468 could include data specific to the relationship, such as but not limited to relationship type or designation, recent transactions, aggregate statistics of transaction history, shared assets or financial interests, or other kinds of data that characterizes the association. In some implementations, displayed risk data can be retrieved from local memory in the user device 110, or requested from an external device (e.g., a server of provider computing system 130). Relationship data can also be displayed or otherwise combined with data found in other data panels. In both FIGS. 4A and 4B, data panels 416 and 462 may exist in some embodiments in which data relating specifically to the EOI is displayed, regardless of what node or edge is selected. Such data displayed in panels 416 and 462 could also be different than the data previously displayed before the selection of a node or edge.

Process 200 can be partially or completely repeated to retrieve or display additional information about other entities sequentially. Additionally, nodes or edges can be unselected such that the data panels 416, 418, 462, 464, 466, and/or 468 remove all displayed data related to the previously-selected node. Process 200 may also allow multiple nodes or edges to be selected at the same time and display multiple sets of data associated with the multiple nodes or edges.

Figure 5:
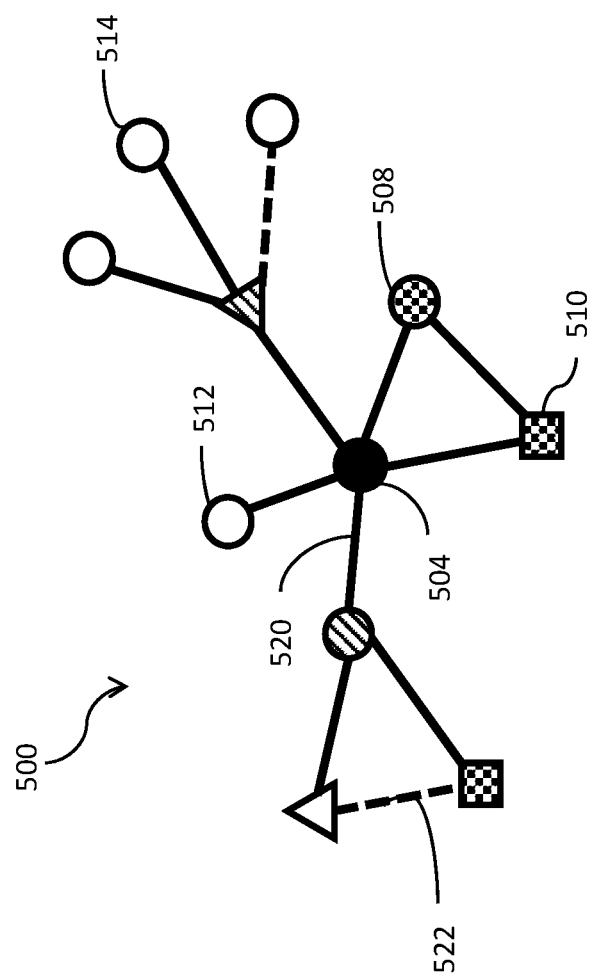
FIG. 5 depict an example graphical user interface, according to potential embodiments.

Referring to FIG. 5, an example relationship graph 500 according to various embodiments is depicted. Relationship graph 500 represents associations between an EOI and related entities. Relationship graph 500 may include a central node 504, related nodes 508, 510, 512, and 514, and edges 520 and 522. Nodes generally represent an entity (e.g., the EOI, another customer of the financial institution, an individual unaffiliated with the financial institution, a company, business venture, etc.) while edges generally represent the existence of a relationship between two entities. In some embodiments, nodes can represent one or more entities. Nodes and corresponding edges in relationship graph 500 can be added or deleted dynamically. For example, in some implementations, a GUI with a relationship graph may allow a user to select a node (other than the central node) to replace the existing central node with the selected node as a new central node. The nodes and edges in the relationship graph may be dynamically rearranged as appropriate to switch central nodes.

In various embodiments, central node 504 can be the EOI or another entity selected for primary analysis. Nodes 508, 510, 512, and 514 represent entities related to the EOI with various degrees of association. Nodes 504, 508, 510, 512, and 514 can have the same appearance (shape, color, pattern, etc.) as each other, or appearance may be chosen arbitrarily or for aesthetic reasons. In various embodiments, two or more of the nodes 504, 508, 510, 512, and 514 may have appearances (shapes, colors, patterns, or any other stylistic feature or combinations thereof) that are different from each other. In such embodiments, the presented stylistic differences may indicate a different type or quality of the entity. Entities can be distinguished based on entity category, calculated risk, strength of relationship to the COI, or any other metric or distinction. For example, if the node shapes are varied, a circular node could indicate an individual, while a square node could indicate a business organization.

In another example, if node color is varied, a red node could indicate a high-risk entity, while a blue node could represent a relatively low-risk entity. In yet another example, the color and shape variations may be used in combination to identify both the type of entity and the relative risk of the entity.

Edges 520 and 522 may indicate a relationship between two entities by graphically connecting the corresponding nodes. Like nodes, edges can vary in appearance, such as, but not limited to, shape, color, pattern, style (e.g., dashed and solid lines), other stylistic feature, or any combination thereof, to indicate different types, characteristics, or likelihoods of relationships, or to indicate reliability and/or other qualities of the data used to identify the relationship. Variation of the shape, length, color, pattern, or style can provide indications such as strength of relationship, potential for risky interaction, magnitude of shared financial wealth, financial dependence, frequency of transaction between entities, or other metric characterizing the relationship. For example, a solid-lined edge 520 may indicate a strong relationship between two entities, while a dashed line 522 may indicate a weak relationship between entities. In another example, a red edge may indicate a relationship with many transactions between the two entities, while a blue edge may indicate a relationship with few or infrequent transactions between the two entities. In some embodiments, edge style (e.g., solid or dashed), edge color (e.g., red or blue), and/or other distinctions in appearance may be used in combination to indicate both magnitude and frequency of interaction or other characteristics.

Nodes in relationship graph 500 have varying degrees or levels of association with respect to EOI 504. Central node 504 has a DOS value of zero, node 508 has a DOS value of one, and node 514 has a DOS value of two. Relationship graph 500 can be generated to, for example, include all entities with a DOS value smaller than or equal to a maximum DOS, and exclude entities from the relationship graph with a DOS value greater than the specified DOS. The specified DOS can be changed to dynamically update the relationship graph to include more or less data and/or more or fewer entities.

Nodes in relationship graph 500 can be repositioned and reconfigured in various embodiments. It should be understood that when describing repositioning nodes in a network graph, the edges associated with the node are also adjusted such that the edge continues to connect two nodes. Nodes can be repositioned, for example, manually by a user or automatically by application 112. In some embodiments, the positioning of nodes in a relationship graph may be arbitrary, carrying no significant meaning as to their placement. In various embodiments, nodes in a relationship graph may be arranged and/or rearranged to enhance appearance or viewability, such as to improve symmetry about a central node, increase or decrease the total area or footprint of the relationship graph, simplify the edge orientations, and/or minimize edge lengths. In various embodiments, the relationship graph may be rearranged to minimize the number of intersections between edges. In certain embodiments, nodes may be rearranged following the addition or deletion of a node and/or edge from the relationship graph. In some embodiments, nodes can be positioned relative to their DOS value, such as a generation tree or levels of association tree.

In various embodiments, the distance between nodes may indicate a characteristic of the entities represented by the nodes. For example, in potential embodiments, nodes having a similar nature may be located closer together, whether or not they exhibit a relationship denoted by an edge. In such examples, entities with certain associations (e.g., related as family members) with the EOI may be located in one region or area of the relationship graph while entities having certain other associations (e.g., related by business interaction) may be located in another region or area. In certain embodiments, the length of an edge between two nodes may be indicative of a quality or characteristic of the relationship. For example, in potential embodiments, an edge connecting two nodes with a short length may indicate the two entities represented by the nodes are more closely related or exhibit a stronger relationship. A relationship's strength may be correlated with, for example, value of shared assets, frequency of transactions, how binding a legal relationship is, or any characteristic corresponding to difficulty in dissociating or dissolving a relationship or separating from each other. In this example, then, an edge with a greater relative length may indicate the two entities connected by the edge do not have as strong of a relationship. In variations of such an example, the lengths of edges may be restricted to a series of discrete values (e.g., multiples of a minimum length) or lengths could vary along a continuous spectrum.

Figure 6:
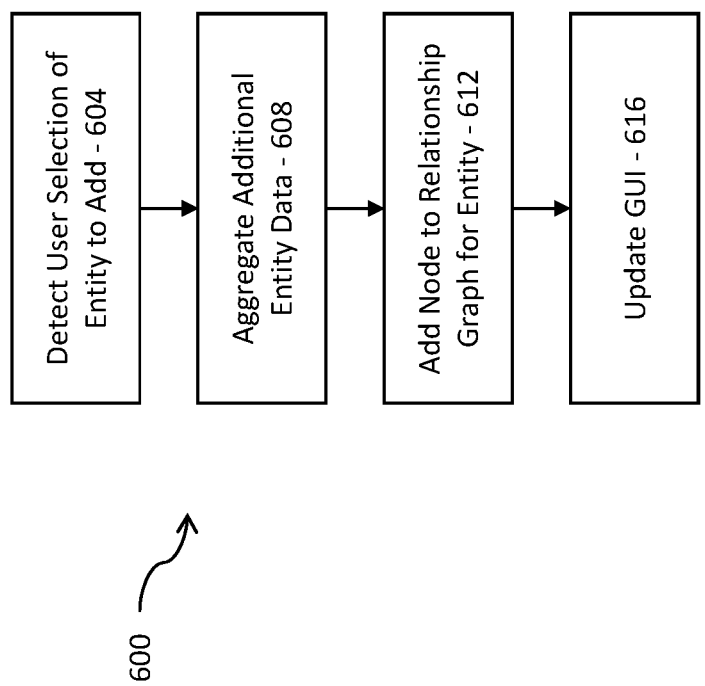
FIG. 6 depict a flowchart of an example node addition process, according to potential embodiments.

Referring now to FIG. 6, a process 600 is depicted for dynamically adding entities to a relationship graph, according to various embodiments. Process 600 may be performed with respect to any relationship graph with which a user may interact. Similar to process 200, process 600 may be perform by the user device 110 of system 100 and/or by the provider computing system 130. In some embodiments, process 600 may be performed after process 200. In certain embodiments, process 600 may be integrated into various steps of process 200.

Figure 7A:
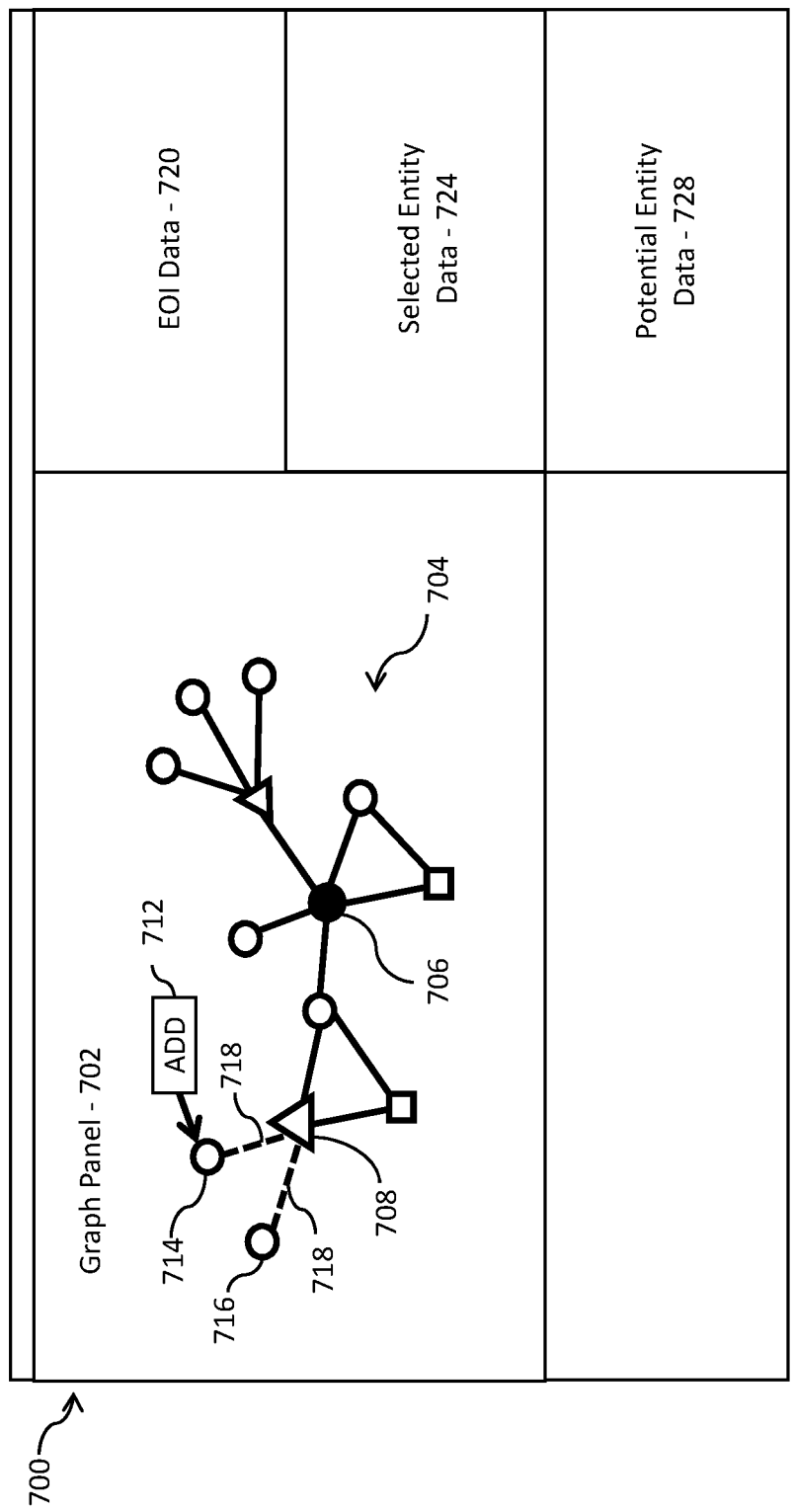
FIGS. 7A and 7B depict example graphical user interfaces involved in a node addition process, according to potential embodiments.

Process 600 includes receiving an indication to add an entity to a relationship graph at step 604. The indication can be generated by the user (e.g., based on a user input) or by, for example, application 112. In some embodiments, a user can select an entity to be added to the relationship graph via, for example, a list, text search box, and/or pop-up menu. In potential embodiments, the user can specify criteria for entities which are being considered for being added, such as entities who are co-owners of an asset with an entity currently represented in the relationship graph, or entities that have made engaged in a financial exchange with a specific entity in the graph recently (e.g., in the past two days) or during a certain time period (e.g., the previous calendar year). Any combination of criteria could be used to filter and select entities to add. In various embodiments, a user may indicate his or her intention to add a node to the relationship graph, and the application populates the relationship graph with one or more entities to potentially add (e.g., suggested or known entities that could be added) positioned about one or more existing nodes based on retrieved or stored risk data. As depicted in FIG. 7A, relationship graph 704 populates potential nodes 714 and 716 about node 708. The user can then select which of the potential nodes the user would like to add to the relationship graph. In FIG. 7A, pop-up box 712 allows the user to select node 714 as the entity to add to the relationship graph. The dashed lines 718 may indicate to the user that the corresponding nodes are potential nodes to select from and not yet a part of the relationship graph 704. The dashed lines also indicate how the potential node is associated with nodes currently in the relationship graph 704.

At step 608, additional risk data is retrieved regarding the selected entity to be added. Risk data retrieval at step 608 can be performed in the same or similar manner to the data retrieval of step 208 of process 200. Risk data retrieved at step 608 can be, for example, used to determine relationships with other entities, used to calculate risk scores and metrics, and/or displayed to the user via the GUI 700. The retrieved data can be stored for subsequent use on, for example, the user device 110 and/or provider computing system 130.

At step 612, application 112 may add the selected entity to the relationship graph. Step 612 may involve utilizing the retrieved risk data from step 608 to determine what relationships exist between the added entity and entities represented by existing nodes in the relationship graph. The addition of the specified entity may, for example, be stored in relationship database 136 of the provider computing system 130 for subsequent graph generation. Step 612 may also include adding any necessary edges to the relationship graph as appropriate.

Figure 7B:
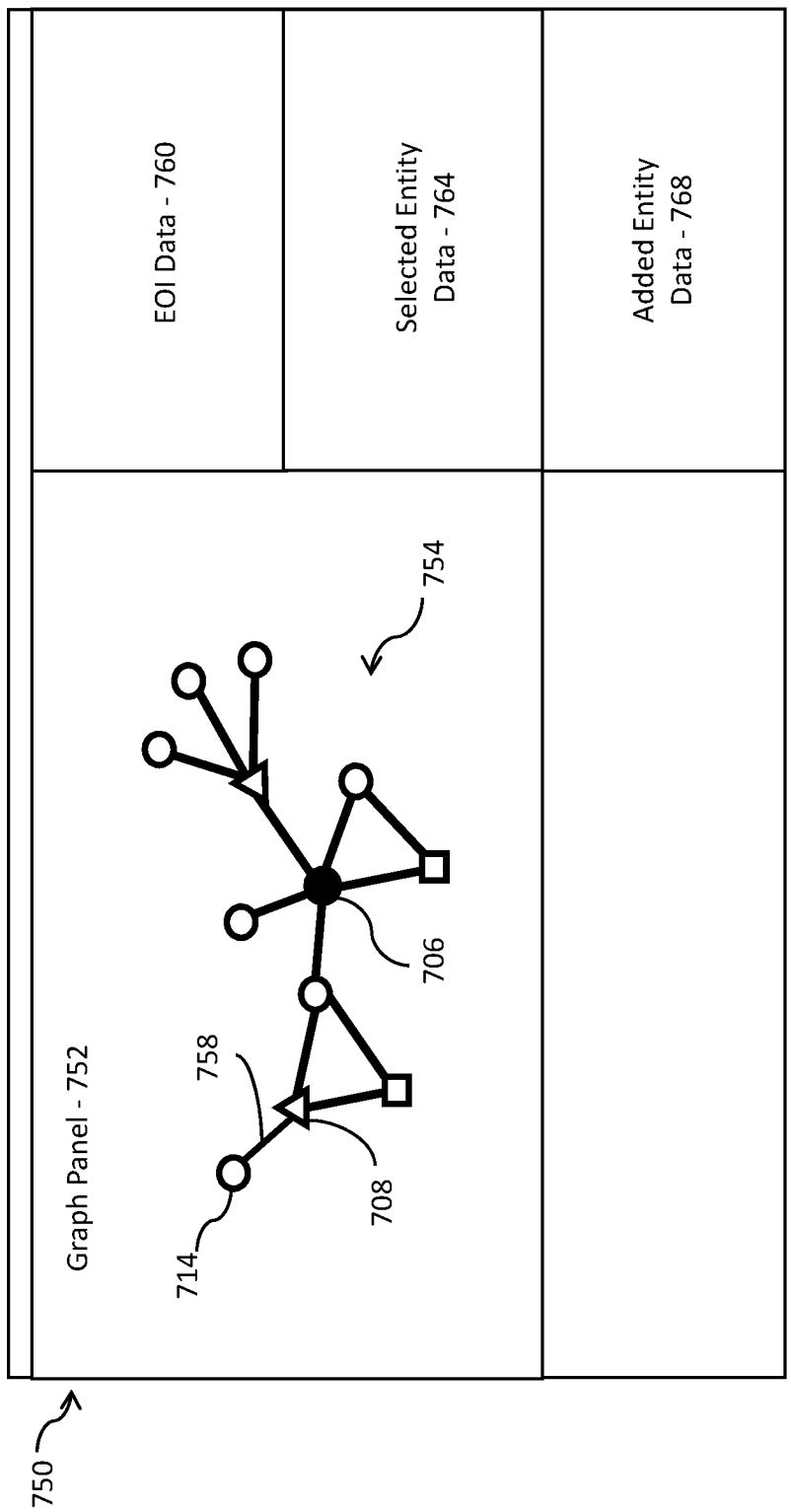

The GUI may be updated at 616 to reflect the addition of the entity. In FIG. 7B, the new node 714 has been connected to node 708 as specified, and the potential node 716 has been removed from the GUI 750. In some embodiments, one or more nodes' positions in relationship graph 754 may be rearranged for various reasons, as seen with respect to node 714. In some cases, nodes' positions may be changed to be more visually appealing or symmetrical. In other cases, nodes' positions may be changed such that edge lengths are uniform or minimized. Data in data panels 760, 764, and 768 can be added or changed based on the addition of the new node in relation to the EOI, a previously selected node, or the added node.

Process 600 can be performed in a similar manner to add an edge to a relationship graph. For example, a user may want to indicate a relationship between two entities presented in the relationship graph that was not previously presented. Such an addition may be desired if, for example, a relationship is identified in data not considered by the relationship graph generator 114, or if the association did not meet a predefined criterion for automated inclusion. In potential embodiments, the application 112 receives an indication to add an association/edge between two entities/nodes, adds the edge to the relationship graph, gathers additional data on the association, and updates the GUI with the added edge, as well as, in some embodiments, additional data related to the association (e.g., in one or more data panels).

Referring now to FIG. 8, an example process 800 for removing nodes from a relationship network graph is shown according to potential embodiments. Process 800 may be performed after process 200 or may be integrated into steps of process 200. Process 800 may also be performed before or after process 600. Process 800 may remove nodes dynamically from a generated relationship graph displayed on a GUI.

Figure 9A:
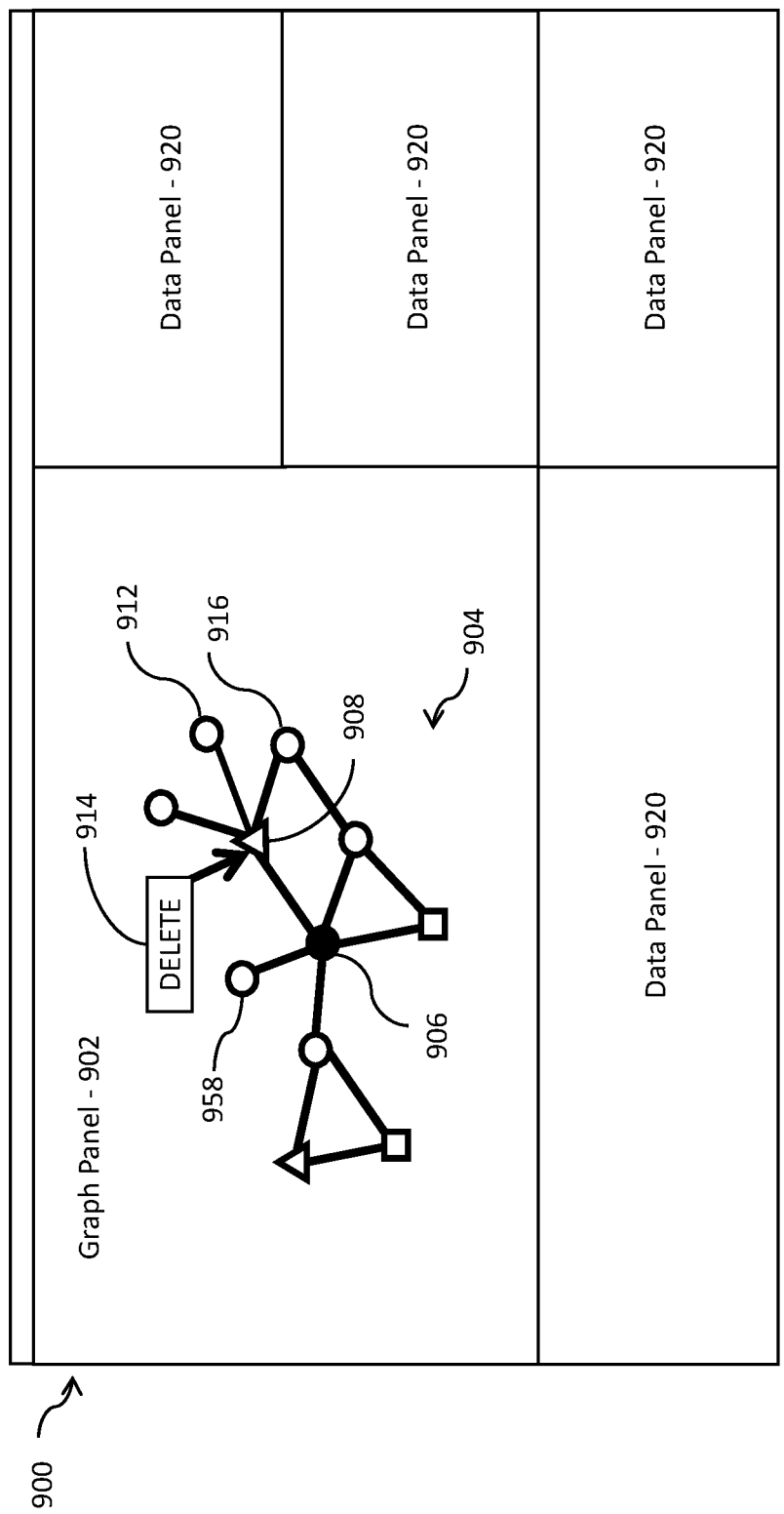
FIGS. 9A and 9B depict an example graphical user interface involved in a node deletion process, according to potential embodiments.

At step 804, an entity in the relationship graph may be selected for deletion. Similar to step 604 in process 600, the selection may be generated by, for example, the user or by the application 112. In some embodiments, a user can utilize, for example, a list, text search box, and/or pop-up menu to select a specific entity to delete from the relationship graph. In potential embodiments, the user may specify a criterion for entities to potentially be removed, such as entities not related by family, or entities that have engaged in a financial exchange with the EOI that amount to less than a threshold (e.g., $1,000 or $10,000). Any combination of criteria could be used to filter and/or select an entity to remove. In some embodiments, a user indicates his or her intention to remove an entity from the relationship graph by selecting the node directly on the displayed relationship graph (e.g., by touching the node on a touchscreen). Referring to FIG. 9A, a user may identify node 908 in relationship graph 904 as the node to remove from relationship graph 904. Graph panel 902 may include a pop-up message 914 to allow the user to make the selection to delete (e.g., by touching the pop-up "delete" box).

At step 808, the node corresponding to the entity to remove is removed from the relationship graph. Any edges connected to the deleted node can be removed as well at step 808. The deletion at step 808 may also be reflected in, for example, relationship database 136 such that future generation of a similar relationship graph will exclude the entity. In alternate embodiments, nodes can be hidden from the displayed relationship graph rather than being removed entirely. In such embodiments, the hidden node may be more easily added back to view for the user rather than having to computationally reevaluate a deleted entity's relationship to nodes in the graph each time. In some embodiments, a hidden node may be reflected in user device 110 and/or provider computing device 130 (e.g., in relationship database 136) by associating the hidden node with a hidden status indicator.

At step 812, any node dependent on the deleted node and is no longer connected to the relationship graph can be removed. A dependent node is a node which was a child node to the deleted node (i.e., was further related to the COI than the deleted node). In FIG. 9A, for example, nodes 912 and 916 are dependent nodes of node 908 since, for example, node 912 has a DOS of two while node 908 has a DOS of one, and node 912 is connected to node 908, and similarly for node 916. In some embodiments, all such dependent nodes of a deleted node are also removed from the relationship graph, as well as any edges and further dependent nodes and so on. In potential embodiments, if a dependent node has another edge connecting it to another node in the graph not dependent on the deleted node, such that it is still connected to the relationship graph after the removal of the delete node, such a dependent node may not be deleted and may instead remain in the graph, as seen with node 916 in FIG. 9B.

Figure 9B:
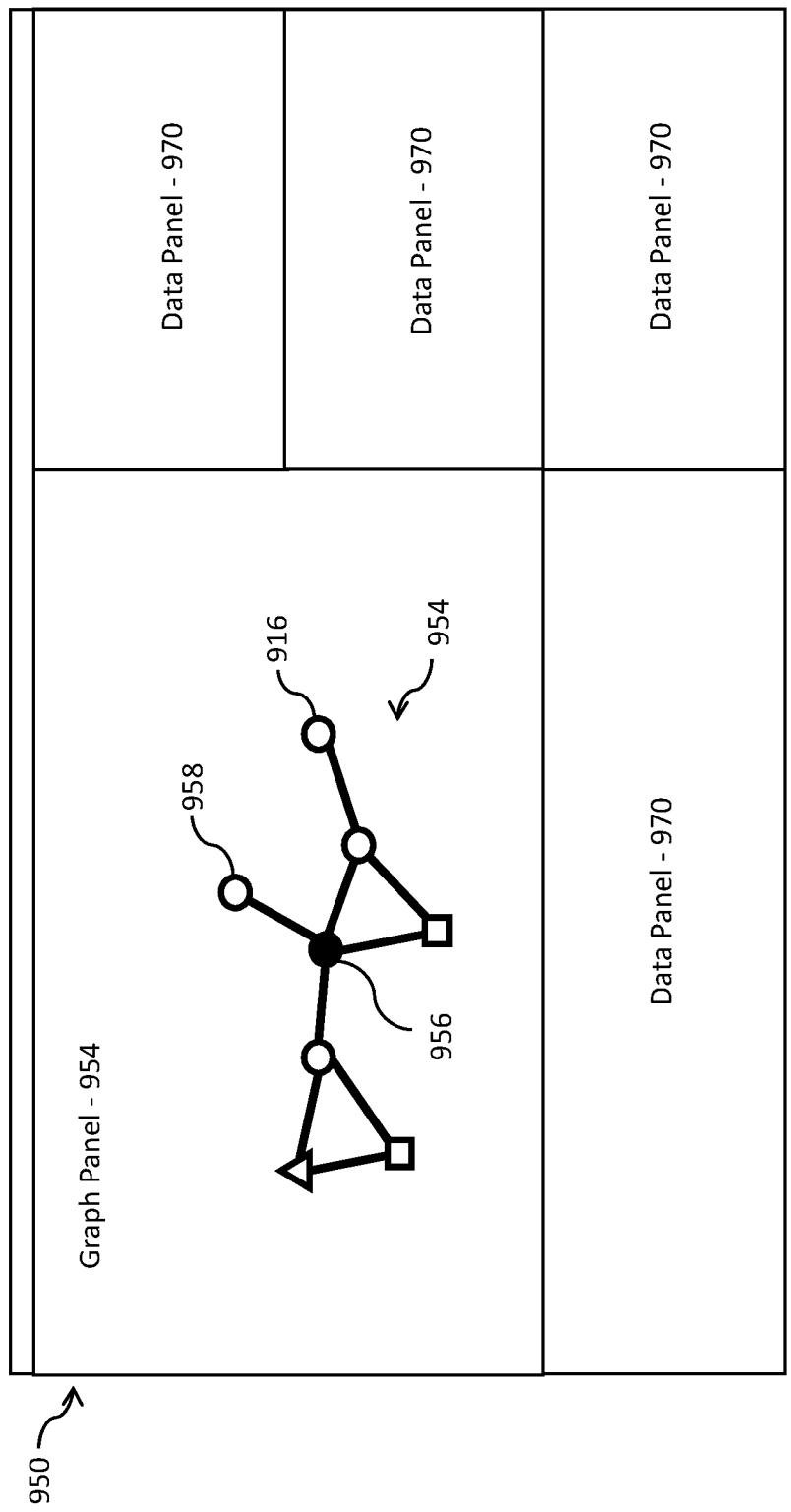

At step 816, the GUI 950 is updated to reflect any deletions from the relationship graph. As seen again in FIG. 9B, node 908 was removed from the network graph 954 as well as dependent node 912. Node 916, which had an edge connected to another node in the relationship graph, was not deleted. Further, as seen in FIG. 9B, the relationship graph can be rearranged based on the removal of nodes from the relationship graph 954, as seen with nodes 958 and 916. In some embodiments, a relationship graph may reposition the nodes to improve visual symmetry. In various embodiments, the relationship graph may reposition the nodes to reflect new relative quantities or degrees of relationship as a result of the removal of the node. In certain embodiments, the relationship graph may reposition itself to minimize edge lengths in the graph.

Data panels 920 and 970 may be updated dynamically to display, for example, risk data associated with any of the EOI, a selected or previously selected node, a potential node for removal, or the final node or nodes deleted from the relationship graph 954. Risk data may be dynamically updated as the user navigates the relationship graph 954. For example, a user may hover over or initially select a node in the relationship graph 904, and application 112 may display data associated with that node in a data panel 920 for the user to use in deciding whether the node should be removed from the network graph. Similarly, data associated with a removed node can be displayed in data panel 970 after the deletion is complete to indicate to the user which node was removed.

Edges may also be deleted from relationship graphs in a manner similar to process 800. Edges, like nodes, may be deemed irrelevant or distracting to the user, for example. In such embodiments, and similar to process 800, the system receives an indication to remove an edge between nodes in a relationship graph. The system can delete the edge from the relationship graph, as well as remove nodes previously attached to the deleted edge that no longer have any connected edges in the relationship graph. The system can then update the GUI with the updated relationship graph reflecting the removal of the edge from the relationship graph.

Previously-built relationship graphs, after manipulation through graph criteria, additions, and subtractions, or other manipulations can be saved and later retrieved in a database such as relationship graph database 136. Such saved data allows a user device 110 or provider computing system 130 to reduce the computation time and complexity in generating subsequent relationship graphs by utilizing previously processed data and relationship graphs. Relationship data may be stored as a list of identified relationships and associated characteristics, qualities, or nature of said relationship, as complete or partial relationship graphs for subsequent use or modifications, or user preference data wherein a user retrieves his or her desired settings, configurations, or criteria for generating a relationship graph for analysis. Saved relationship data may also be useful when other users will later want to access the same analysis tools used by a first user.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method comprising:
receiving, by a computing system from multiple servers, data on a first entity, a second entity, and a third entity, the data comprising one or more video clips associated with the first entity, the second entity, and the third entity;
executing, by the computing system, a natural language processing model on the one or more video clips associated with the first entity, the second entity, and the third entity to generate (i) association data identifying the first entity, the second entity, and the third entity, and (ii) structured data corresponding to the first entity, the second entity, and the third entity for risk analysis;
generating, by the computing system, based on the association data, a first association between the first and second entities and a second association between the second and third entities;
generating, by the computing system, based on the identified associations, a first relationship graph with first, second, and third nodes corresponding to the first, second, and third entities, respectively, and first and second edges corresponding to the first and second associations, respectively, wherein the first edge graphically connects the first and second entities and the second edge graphically connects the second and third entities;
displaying, by the computing system via a touchscreen display, a graphical user interface (GUI) comprising the first relationship graph such that the nodes and edges are selectable by a user, the first, second, and third nodes corresponding to first, second, and third positions in the GUI, respectively;
retrieving, by the computing system responsive to displaying the graphical user interface, risk metrics corresponding to each of the first, second, and third entities from a plurality of external data sources;
generating, by the computing system, additional risk data for the first, second, and third entities based on the structured data, the risk metrics, the additional risk data comprising alias data corresponding to the first, second, and third entities;
displaying, by the computing system via the touchscreen display, a data panel in the GUI that is separate from the first relationship graph, the data panel listing the risk metrics, the additional risk data including the alias data, and metrics associated with each of the first, second, and third entities, the metrics retrieved from one or more third-party computing systems responsive to displaying the first, second, and third nodes;
detecting, by the computing system via the touchscreen display, a first selection from a first touch of the touchscreen display at the second position corresponding to the second node of the first relationship graph;
displaying, by the computing system in the GUI, information on the second entity corresponding to the second node and a prompt to remove the second node corresponding to the second entity from the first relationship graph;
detecting, by the computing system via the touchscreen display, a second selection from a second touch of the prompt to remove the second node corresponding to the second entity from the first relationship graph;
storing, by the computing system in a data structure, responsive to detecting the second selection, display information comprising relative positions of the first, second, and third nodes and the first and second edges;
generating, by the computing system, a second relationship graph as an update of the first relationship graph;
displaying, by the computing system, in a graph panel that is separated from the first relationship graph, the second relationship graph;
removing, by the computing system, from the second relationship graph, (i) the second node, and (ii) the first and second edges;
adjusting, by the computing system, in the second relationship graph, the first position of the first node corresponding to the first entity and the third position of the third node corresponding to the third entity following removal of the second node and the first and second edges;
dynamically updating, by the computing system via the touchscreen display, the data panel in the GUI to exclude risk ratings and metrics associated with the second entity;
detecting, by the computing system, a third selection to display the second node on the second relationship graph;
retrieving, by the computing system, from the data structure responsive to the third selection, the display information;
displaying, by the computing system in the GUI, and based on the retrieved display information, (i) the first, second, and third nodes in their respective positions and (ii) the first and second edges without computationally reevaluating the first and second associations;
dynamically updating, by the computing system via the touchscreen display, the data panel in the GUI to include the risk ratings and metrics associated with the second entity;
determining, by the computing system, a respective degree of separation (DOS) value for each of the first, second, and third nodes; and
automatically repositioning, by the computing system, the first, second, and third nodes within the GUI based on the respective DOS value of each of the first, second, and third nodes.

2. The method of claim 1, wherein the first, second, and third nodes are represented as two-dimensional geometric shapes in the GUI.

3. The method of claim 2, wherein the first, second, and third nodes are represented by two or more different two-dimensional shapes, each shape corresponding to a different entity characteristic.

4. The method of claim 1, wherein the first and second edges are represented as lines in the GUI.

5. The method of claim 4, wherein the first and second edges are represented by two different line styles, each line style corresponding to a different association characteristic.

6. The method of claim 1, wherein the first relationship graph includes a third edge, and wherein the GUI is displayed so as to minimize a number of intersections between the first, second, and third edges.

7. The method of claim 1, wherein the identifying of the first association and the second association is based on data from transfers of money or an ownership of a business.

8. The method of claim 1, wherein the data received from the multiple servers comprises unstructured data, the method of claim 1 further comprising generating, by the computing system, additional data on the first, second, and third entities from the unstructured data using machine learning algorithms or data mining techniques.

9. The method of claim 1, wherein the data panel is a first data panel, and wherein the GUI further comprises a second data panel that is separated from the first relationship graph, and wherein the information on the second node is displayed in the second data panel.

10. The method of claim 1, further comprising
receiving, by the computing system, from one or more of the multiple servers, additional or updated information on the second node while displaying the information on the second node; and
displaying, by the computing system, in the GUI, the additional or updated information on the second node.

11. The method of claim 1, further comprising:
detecting, by the computing system via the touchscreen display, a fourth selection of the first edge to remove the first edge from the second relationship graph;
updating, by the computing system, responsive to the fourth selection, the second relationship graph to remove the first edge from the second relationship graph; and
displaying, by the computing system in the GUI, an updated second relationship graph.

12. The method of claim 1, further comprising:
displaying, by the computing system, an indication to add a fourth node to the second relationship graph;
adding, by the computing system, the fourth node to the second relationship graph; and
displaying, by the computing system in the GUI, an updated second relationship graph.

13. The method of claim 1, further comprising:
applying, by the computing system, a first filter to the first relationship graph to display nodes associated with a common geographic region; and
applying, by the computing system, a second filter to the second relationship graph to display nodes associated with a common transaction amount.

14. A computing device comprising:
a processor and a memory storing instructions which, when executed by the processor, cause the processor to:
receive, from multiple remote systems or devices, data on a first entity, a second entity, and a third entity, the data comprising one or more video clips associated with the first entity, the second entity, and the third entity;
execute a natural language processing model on the one or more video clips associated with the first entity, the second entity, and the third entity to generate (i) association data identifying the first entity, the second entity, and the third entity, and (ii) structured data corresponding to the first entity, the second entity, and the third entity for risk analysis;
generate, based on the association data, a first association between the first and second entities and a second association between the second and third entities;
generate a first relationship graph with selectable nodes corresponding to entities and selectable edges corresponding to associations between entities, wherein the first relationship graph includes first, second, and third nodes corresponding to the first, second, and third entities, respectively, and first and second edges corresponding to the first and second associations, respectively, with the first edge graphically connecting the first and second entities and the second edge graphically connecting the second and third entities;
display, via a touchscreen display, a graphical user interface (GUI) comprising the first relationship graph such that the nodes and edges are selectable by a user, the first, second, and third nodes corresponding to first, second, and third positions in the GUI, respectively;

retrieve, responsive to displaying the graphical user interface, risk metrics corresponding to each of the first, second, and third entities from a plurality of external data sources;

generate additional risk data for the first, second, and third entities based on the structured data, the risk metrics, the additional risk data comprising alias data corresponding to the first, second, and third entities;

display, via the touchscreen display, a data panel in the GUI that is separate from the first relationship graph, the data panel listing the risk metrics, risk ratings, the additional risk data including the alias data, and metrics associated with each of the first, second, and third entities, the risk ratings determined in part based on the natural language processing model and metrics retrieved from one or more third-party computing systems responsive to displaying the first, second, and third nodes;

detect, via the touchscreen display, a first selection from a first touch of the touchscreen display at the second position corresponding to the second node of the first relationship graph;

display, in the GUI, information on the second entity or association corresponding to the second node and a prompt to remove the second node corresponding to the second entity from the first relationship graph;

detect, via the touchscreen display, a second selection from a second touch of the prompt to remove the second node corresponding to the second entity from the first relationship graph;

store, in a data structure, responsive to detecting the second selection, display information comprising relative positions of the first, second, and third nodes and their respective positions and the first and second edges;

generate, a second relationship graph as an update of the first relationship graph;

display, in a graph panel that is separated from the first relationship graph, the second relationship graph;

remove, from the second relationship graph, (i) the second node and (ii) the first and second edges;

adjust, in the second relationship graph, the first position of the first node corresponding to the first entity and the third position of the third node corresponding to the third entity following removal of the second node and the first and second edges;

dynamically update, via the touchscreen display, the data panel in the GUI to exclude risk ratings and metrics associated with the second entity;

detect, via the touchscreen display, a third selection to display the second node in the second relationship graph;

retrieve, from the data structure responsive to the third selection, the display information;

display, in the GUI, and based on the retrieved display information, (i) the first, second, and third nodes in their respective positions and (ii) the first and second edges without computationally reevaluating the first and second associations;

dynamically update, via the touchscreen display, the data panel in the GUI to include the risk ratings and metrics associated with the second entity;

determine a respective degree of separation (DOS) value for each of the first, second, and third nodes; and automatically reposition the first, second, and third nodes within the GUI based on the respective DOS value of each of the first, second, and third nodes.

15. The computing device of claim 14, wherein the data received comprises unstructured data, and wherein the processor is further caused to generate additional data on the first, second, and third entities from the unstructured data using machine learning algorithms or data mining techniques.

16. The computing device of claim 14, wherein the data panel is a first data panel, and wherein the GUI further comprises a second data panel that is separated from the first relationship graph, and wherein the processor displays information on the second entity corresponding to the second node in the second data panel.

17. The computing device of claim 14, wherein the processor is further caused to update, in real-time or near real-time subsequent to detecting the first selection of the second node of the first relationship graph, the information displayed on the second entity corresponding to the second node based on data from one or more remote systems or devices.

18. The computing device of claim 14, wherein the processor is further configured to detect, via the touchscreen display, a fourth selection of a fourth node for addition to the second relationship graph, and wherein the processor is further caused to add the fourth node to the second relationship graph.

19. A computer-implemented method comprising:

receiving, by a computing system from multiple servers, data on a first entity, a second entity, a third entity, the data comprising one or more video clips associated with the first entity, the second entity, and the third entity;

execute a natural language processing model on the one or more video clips associated with the first entity, the second entity, and the third entity to generate (i) association data identifying the first entity, the second entity, and the third entity, and (ii) structured data corresponding to the first entity, the second entity, and the third entity for risk analysis;

generate, based on the association data, a first association between the first and second entities, and a second association between the second and third entities;

displaying, by the computing system via a touchscreen display, a first graphical user interface (GUI) with first, second, and third selectable geometric shapes corresponding to the first, second, and third entities, respectively, and first and second selectable lines corresponding to the first and second associations, respectively, wherein the first line graphically connects the first and second geometric shapes, and the second line graphically connects the second and third geometric shapes, the first, second, and third geometric shapes corresponding to first, second, and third positions in the first GUI, respectively;

retrieve, responsive to displaying the first graphical user interface, risk metrics corresponding to each of the first, second, and third entities from a plurality of external data sources;

generate additional risk data for the first, second, and third entities based on the structured data, the risk metrics, the additional risk data comprising alias data corresponding to the first, second, and third entities;

displaying, by the computing system via the touchscreen display, a data panel that is separate from the first GUI, the data panel listing the risk metrics, the additional risk data including the alias data, and metrics associated with each of the first, second, and third entities, the metrics retrieved from one or more third-party computing systems responsive to displaying the first, second, and third geometric shapes;

detecting, by the computing system via the touchscreen display, a first selection from a first touch of the touchscreen display at the second position corresponding to the second geometric shape displayed in the first GUI;

displaying, by the computing system in the first GUI, information on the second entity corresponding to the second geometric shape and a prompt to remove the second geometric shape corresponding to the second entity;

detecting, by the computing system via the touchscreen display, a second selection from a second touch of the prompt to remove the second geometric shape corresponding to the second entity from the first GUI;

storing, by the computing system in a data structure, responsive to detecting the second selection, display information comprising relative positions of the first, second, and third geometric shapes and their respective positions and the first and second lines;

generating, by the computing system, a second GUI that is a past version of the first GUI;

displaying, by the computing system, in a graph panel that is separated from the first GUI, the second GUI;

removing, by the computing system, from the first GUI, (i) the second geometric shape, and (ii) the first and second lines;

adjusting, by the computing system, the first position of the first geometric shape corresponding to the first entity and the third position of the third geometric shape corresponding to the third entity following removal of the second geometric shape and the first and second lines;

dynamically updating, by the computing system via the touchscreen display, the data panel to exclude risk ratings and metrics associated with the second entity;

detecting, by the computing system, a third selection to display the second geometric shape on the first GUI;

retrieving, by the computing system, from the data structure responsive to the third selection, the display information;

displaying, by the computing system in the first GUI, and based on the retrieved display information, (i) the first, second, and third geometric shapes in their respective positions and (ii) the first and second lines without computationally reevaluating the first and second associations;

dynamically updating, by the computing system via the touchscreen display, the data panel to include the risk ratings and metrics associated with the second entity;

determining, by the computing system, a respective degree of separation (DOS) value for each of the first, second, and third nodes; and automatically repositioning, by the computing system, the first, second, and third nodes within the first GUI based on the respective DOS value of each of the first, second, and third nodes.

\* \* \* \* \*